United States Patent
Khan

(10) Patent No.: US 9,902,864 B2
(45) Date of Patent: Feb. 27, 2018

(54) TWO-COAT BARRIER SYSTEM COMPRISING POLYURETHANE

(75) Inventor: Sarfaraz Khan, Kent (GB)

(73) Assignee: Sun Chemical Corporation, Parsippany, NJ (US)

( * ) Notice: Subject to any disclaimer, the term of this patent is extended or adjusted under 35 U.S.C. 154(b) by 0 days.

(21) Appl. No.: 14/008,431

(22) PCT Filed: Mar. 28, 2012

(86) PCT No.: PCT/GB2012/050689
§ 371 (c)(1),
(2), (4) Date: Dec. 3, 2013

(87) PCT Pub. No.: WO2012/131362
PCT Pub. Date: Oct. 4, 2012

(65) Prior Publication Data
US 2014/0212661 A1    Jul. 31, 2014

Related U.S. Application Data

(60) Provisional application No. 61/469,914, filed on Mar. 31, 2011, provisional application No. 61/468,649, filed on Mar. 29, 2011.

(51) Int. Cl.
| | | |
|---|---|---|
| C09D 7/12 | (2006.01) |
| C08J 5/18 | (2006.01) |
| C09D 175/04 | (2006.01) |
| C08G 18/08 | (2006.01) |
| C08G 18/72 | (2006.01) |
| C08J 7/04 | (2006.01) |

(52) U.S. Cl.
CPC ....... C09D 7/1216 (2013.01); C08G 18/0823 (2013.01); C08G 18/722 (2013.01); C08J 5/18 (2013.01); C08J 7/042 (2013.01); C09D 175/04 (2013.01); *C08J 2367/02* (2013.01); *C08J 2375/04* (2013.01); *C08J 2475/04* (2013.01); *Y10T 428/273* (2015.01); *Y10T 428/31551* (2015.04); *Y10T 428/31609* (2015.04)

(58) Field of Classification Search
CPC ............ C08G 18/0823; C08G 18/3221; C08G 18/722; C08J 2367/02; C08J 2375/04; C08J 2475/04; C08J 5/18; C08J 7/042; C09D 175/04; C09D 7/1216; Y10T 428/273; Y10T 428/31551; Y10T 428/31605; Y10T 428/31609

USPC ............ 428/423.1, 425.9; 427/333; 524/590, 524/591, 872, 873
See application file for complete search history.

(56) References Cited

U.S. PATENT DOCUMENTS

| | | | |
|---|---|---|---|
| 4,992,507 A | 2/1991 | Coogan et al. | |
| 6,569,533 B1* | 5/2003 | Uchida | C08G 18/0823 428/423.1 |
| 2001/0016260 A1* | 8/2001 | Yoshida et al. | 428/425.8 |
| 2005/0196601 A1* | 9/2005 | Fitzgerald | C08G 18/0823 428/304.4 |
| 2005/0197480 A1 | 9/2005 | Temple et al. | |
| 2008/0070043 A1 | 3/2008 | Arai et al. | |
| 2010/0136350 A1 | 6/2010 | Inaba et al. | |
| 2010/0017403 A1 | 7/2010 | Temple et al. | |
| 2012/0053281 A1* | 3/2012 | Feeney | C09D 167/00 524/442 |
| 2012/0270058 A1* | 10/2012 | Tsumagari et al. | 428/447 |

FOREIGN PATENT DOCUMENTS

| | | |
|---|---|---|
| CN | 1685024 A | 10/2005 |
| CN | 101040005 A | 9/2007 |
| EP | 1865020 A1 | 12/2007 |
| JP | 2001-098047 A | 4/2001 |
| JP | 2004-115776 A | 4/2004 |
| JP | 2011-148306 A | 8/2011 |
| WO | WO-2010/129032 A1 | 11/2010 |

OTHER PUBLICATIONS

International Search Report for International Application No. PCT/GB2012/050689, dated Oct. 25, 2012.
Written Opinion of the International Searching Authority for International Application No. PCT/GB2012/050689, dated Oct. 25, 2012.
Chinese Office Action from Chinese Application No. 201280026204.1, dated Jun. 11, 2015 (with English Language Translation).
Japanese Office Action from Japanese Application No. 2014-501716, dated Oct. 19, 2015 (with English Language Translation).
Chinese Office Action issued in Chinese Application No. 2015112301669220, dated Nov. 26, 2015.

* cited by examiner

*Primary Examiner* — Thao T Tran
(74) *Attorney, Agent, or Firm* — Frost Brown Todd LLC

(57) ABSTRACT

A two-coat barrier system employing a coating of a water-dispersible or solvent-soluble polyurethane resin with innate gas and moisture vapor barrier properties and an additional coating of a multivalent metal cation to enhance the overall barrier performance without the need to add fillers.

31 Claims, No Drawings

TWO-COAT BARRIER SYSTEM COMPRISING POLYURETHANE

CROSS REFERENCE TO RELATED APPLICATIONS

This application is the United States national phase filing of the corresponding international application number PCT/GB2012/050689, filed on 28 Mar. 2012, which claims priority to and benefit of U.S. Provisional Application No. 61/468,649, filed on 29 Mar. 2011 and U.S. Provisional Application No. 61/469,914, filed on 31 Mar. 2011, which applications are hereby incorporated by reference in their entirety.

TECHNICAL FIELD

The present invention relates to barrier coatings which may be used to coat and impart barrier properties to a variety of materials, notably films used as packaging for foods and pharmaceuticals. The barrier coatings may, for example, be useful in the formation of adhesively formed laminates. The barrier coatings of the invention advantageously have the ability to block the passage of gases including moisture vapour and, as such, may be particularly useful for use in packaging where prevention of ingress of a gas into, or escape of a gas out of, the packaging is desirable. The coatings advantageously provide an effective gas and/or moisture vapour barrier, especially in high relative humidity environments.

BACKGROUND

Synthetic plastics materials have long been used for the packaging of foods and other materials which need protection from handling and from moisture. However, in recent years, it has become appreciated that, in addition, many foods and other sensitive materials benefit from being protected from atmospheric oxygen and other gases. Barrier films and packaging materials, which are intended to reduce, or inhibit the permeation of gases, vapors, aromas and others, have been extensively described. Common barrier compositions include polyesters, PVDC, acrylic polymers, polyamides and others. PVDC coated films are widely used and exhibit excellent barrier properties against oxygen and moisture vapor even at high relative humidity, thereby improving the gas barrier of a range of base films with otherwise poor gas barrier properties.

Base films can include biaxially stretched films of polypropylene, nylon, or of polyethylene terephthalate (PET) and cellophane among others. Often these substrates may be laminated with other films and employed for wrapping or packing of a variety of foods to protect against gas egress or ingress. Metalized substrates have also been used for packaging materials due to their excellent gas barrier, however drawbacks are cost, and that they have poor flexibility which causes fracture of the barrier metal layer and are mostly utilized as an intermediate layer of a laminated structures.

In the case of PVDC, these packaging materials are disposed of as non-industrial, domestic waste from homes. Unfortunately, when incinerated they give off toxic waste and hazardous gases. Of great concern is the chlorine containing byproducts, which are highly carcinogenic. Therefore, transition to other barrier polymers is highly desired. Polyvinyl alcohol and copolymers such as ethylene vinyl alcohol copolymer have excellent oxygen barrier performance, however this is highly dependent on the ambient relative humidity. The barrier performance at high relative humidity can be improved by incorporation of additives, crosslinking agents such as silanes, multivalent metal cations, and platy fillers but performance above 75% relative humidity is usually diminished.

In order to protect food under typical conditions of ambient temperature and relative humidity, a barrier coating should provide for example <10 cc m$^2$/day oxygen transmission (OTR) at 90% RH and 23° C.; and <10 gm m$^2$/day at 90% RH and 38° C. moisture vapor transmission (MVTR) (other gases often used to modify the atmospheres inside packages such as carbon dioxide are also important). These coatings may be used either as a surface coatings or may be included as part of a multi-layer laminate structure for example for food packaging applications.

Recently, gas barrier coatings have been developed that include platy, or plate-like, fillers to enhance the gas barrier properties. Such platy fillers are typically inorganic laminar materials, also referred to as layered inorganic materials, and generally have a high aspect ratio (i.e. the ratio between the length and thickness of a single 'sheet' of material), for example an aspect ratio of greater than about 20 in its exfoliated form, such as between 20 and 10,000. Commonly used inorganic laminar materials have an aspect ratio greater than about 50 for example greater than about 100. Inorganic laminar materials include nanoparticulates, especially nanoparticulate clays. A nanoparticle is a particle having at least one dimension in the nanometer range, i.e. of less than 100 nm. Nanoparticulates used as platy fillers typically have a maximum thickness of less than 100 nm, for example, a maximum thickness of less than 50 nm, such as a maximum thickness of less than 20 nm. Examples of commonly used layered inorganic materials include kaolinite, montmorillonite, atapulgite, illite, bentonite, halloysite, kaolin, mica, vermiculite, diatomaceous and fuller's earth, calcined aluminium silicate, hydrated aluminium silicate, magnesium aluminium silicate, sodium silicate and magnesium silicate. Commercial examples of such inorganic laminar materials are Cloisite Na+ (available from Southern Clay), Bentone N. Dak. (available from Elementis). Microlite 963 and Somasif ME100. It is well known, by those experienced in the formulation of gas barrier coatings, that the inclusion of platy (meaning high aspect ratio) particulates, such as clays, increases the barrier effect, usually by creating a more tortuous path for the gas molecules to penetrate the barrier coating. These particles are usually classified as nanoparticles, which are currently attracting much attention particularly with respect to their toxicology and suitability for food packaging components. Furthermore, while improvements in gas barrier properties are often seen, laminate bond strengths are often reduced.

Polyurethanes have been used in printing, coatings and the like for many years. In the conversion of packaging, there are generally four types of polymer used today.

The first is a low number average molecular weight (5000-25000) polyurethane 'adduct' based upon a diisocyanate and long chain diol/triol (e.g. PPG 1000, 1500, 2000; or PTMO 1000, 2000 etc.) which is soluble in organic solvents. This type of polymer does not form a dry film by itself and is used to plasticise harder more brittle resins such as nitrocellulose or cellulose acetate propionate lending better adhesion and flexibility to the films formed.

The second category is elastomeric polyurethanes soluble in organic solvents and are usually based upon a combination of diisocyanates and polyols chosen to impart hard and soft segment domains, which make the polymer a dry film former and typically used in a minimally modified form for lamination ink applications. It is not necessary or indeed practiced to incorporate acid groups into the backbone of solvent soluble polyurethanes, and that modification has been used solely for the purpose of attaining stability in aqueous systems up until now.

The third category is water-borne polyurethane. In order to disperse polyurethanes in water, it is necessary to incorporate a dispersion mechanism since useful polyurethane polymers are insoluble in water. The most common way to achieve this is by incorporating a neutralizable acid group or other anionic hydrophilic group. Commercial water-borne polyurethanes are often neutralized with amines, such as triethylamine, which facilitates neutralization of the carboxyl groups aiding dispersion during chain extensions. Aqueous polyurethane dispersions were found to be slow drying and upon analysis of printed films via gas chromatograph of head space analysis, retained triethylamine was detected above 10 ppb. Although the allowable specific migration limit is expected to be increased to 50 ppb, this limit may well be exceeded at higher film weights and faster press speeds. Whilst it may be possible to substitute this amine with other volatile amines, the drying speed of such coatings is typically slower than solvent soluble polyurethanes which is important for coating speed and production output.

The fourth category is sterically stabilised polyurethanes which are available in water, they are not suited to printing and coating operations.

The use of polyurethanes for barrier applications has accelerated in the last 15 years with several companies such as PPG, Mitsubishi and Mitsui and others all reported to have developed barrier polyurethanes. However, after evaluating these systems, e.g. WPB 341 from Mitsui, it was found that although performance is promising, they fail to exhibit high gas and moisture vapor barrier under high humidity conditions either as a surface print or in a laminate structure. In order to achieve good gas and/or moisture barrier properties using polyurethane resin coatings, it has either been necessary to include an inorganic filler in the coating composition, to treat the surface of the base film, for example, with a metal oxide layer, or use a metallized film.

US 2005/0084686 A1 (Mitsui) and EP 1 674 529 A1 (Mitsui and Futamura) and U.S. Pat. No. 6,569,533 B1 (Mitsui) are examples of aqueous gas barrier coatings that include dispersed polyurethane resins and layered inorganic materials. The water-borne polyurethane dispersions are prepared from an organic solvent-soluble polyurethane pre-polymer, which includes an acid dispersing group such as a carboxylic acid group. The pre-polymer is prepared from reacting an isocyanate, polyol, polyhydroxy acid in an organic solvent, such as methylethyl ketone or acetone. The pre-polymer is then emulsified and reacted with a diamine or other chain-extender to form a water-borne coating composition. The dispersed polyurethane resins of US 2005/0084686 A1 and EP 1 674 529 A1 have a urethane and urea group concentration of 25 to 60 wt % and an acid value of 5 to 100 mgKOH/g. A one-coat system is prepared using the dispersed polyurethane an exfoliated inorganic filler, such as the synthetic mica ME100 or montmorilonite and a polyamine compound or silane coupling agent. The one-coat system is reported as providing a high gas barrier either as a surface coat or within a laminate structure. The polyurethane without any ME100 or montmorilonite is inadequate as a gas or moisture vapor barrier for e.g. food packaging or a suitable replacement for PVDC.

US 2008/0070043 A1 (Toray) report on a gas barrier resin composition comprising (A) a polymer e.g. a polyurethane and (B) an organic compound, e.g. urea, both (A) and (B) containing, a functional group with active hydrogens and/or a polar functional group with a hetero atom. In order to achieve good gas water vapour barrier properties, it is necessary for an inorganic layer, such as a metal oxide layer, e.g. an alumina-evaporated surface, to be applied to the base film underneath the gas barrier resin composition.

Multivalent metal cations have been utilized extensively with polyurethanes either in-situ within the same coating layer as the polyurethane or as a separate coating, either atop or beneath the polyurethane-containing coating, in a multi-layer coating system. In these coatings, the function of the metal cation is to either initiate the curing reaction of a polyol or polyamine or combination thereof with a polyisocyanate to deliver specific properties such as hardening or gloss and to accelerate cure times. Multivalent metal cations used as a separate coating has also been reported to improve hardness of polyurethanes. U.S. Pat. No. 7,655,718 B2 (Ecolab Inc.) is an example the use metal cations in order to initiate or enhance the formation of polyurethanes from isocyanates and polyols. That document describes the use of zinc cationic salt initiators for initiating or enhancing the cure of polyurethanes in floor coatings, e.g. by adding zinc ammonium carbonate to an autohardenable polyurethane precursor composition that includes a polyol or polyamine and a polyisocyanate. Alternatively, the zinc carbonate or other initiator for polyurethane hardening may be present in an isocyanate-free undercoat, which is a separate coat to that containing the polyurethane. The polyurethanes of U.S. Pat. No. 7,655,718 B2 do not contain acid functional groups.

U.S. Pat. No. 5,912,298 (Yuho Chemicals Inc.) and U.S. Pat. No. 5,319,018 (Rohm and Hass) report floor-coating compositions comprising acid-containing polymers and metal cation crosslinkers for use as a one-coat coating system in which the polymer and the crosslinkers are mixed prior to application to the substrate.

One-coat systems that include both reactive polymers that include acid functional groups and metal cation crosslinkers need to be relatively slow reacting otherwise gelation of the coating will occur prior to application. It is often impractical to use slow reacting compositions as barrier layers in packaging applied by printing and coating applications where rapid curing is desirable. Furthermore, once mixed, the coating compositions have a limited pot life before gelation occurs. Thus it is necessary for use coating compositions to be supplied as a two-pack system wherein the reactive polymers that include acid functional groups and the metal cation crosslinkers are kept separate until needed at which point a batch of coating composition is prepared. There is often a significant amount of wastage associated with two-pack systems as it is necessary to prepare an excess coating composition the remainder of which cannot be stored for later use. WO 2010/129028 A1 (Inmat) discloses a one-coat system whereby the coating comprises (a) a dispersed, anionically functionalized matrix resin as a first aqueous dispersion; (b) a second aqueous dispersion comprising a dispersed platy mineral filler, optionally containing one or more additives; (c) a multivalent metal cation cross-linking agent added to at least one of said first or second aqueous dispersions and; (d) admixing the first and second aqueous dispersions to form the one-coat composite system. WO 2005/093000 A1 (PPG) discloses a barrier coating comprising a water-borne dispersion of a polyurethane comprising at least 30 wt % of a meta-substituted aromatic material. The barrier coating compositions may comprise crosslinkers that render the coatings thermosetting. Suitable crosslinkers are reported to include carbodiimides, aminoplasts, aziridines, zinc/zirconium ammonium carbonates and isocyanates. Good barrier properties on the coated film are imparted by the use of inorganic fillers e.g. vermiculite, mica, clays, such as microlite 923 and 963.

EP 2 172 500 A1 (Mitsubishi) discloses a one-coat polyurethane resin composition that includes an active hydrogen compound having hydroxyl groups. The resin composition may include a transition metal cation to promote an oxidation reaction of methylene groups to attain an oxygen-absorbing function.

The treatment of gas barrier coatings that include polymers comprising acid groups with a composition including multivalent metal ions has previously been employed to enhance the properties of the barrier coating. However, a platy mineral filler has been required to achieve good barrier performance. For example, WO 2010/129032 A1 (Inmat) discloses a gas barrier film comprising a matrix resin and a platy filler. The formed film is then surface treated with a multivalent metal cation crosslinking agent to stabilize the barrier film against the effects of humidity, which can potentially reduce barrier performance. The matrix resin is a water-emulsifiable polymer that includes salts of acid groups. Whilst the disclosure of WO 2010/129032 A1 is primarily directed to the use of sulfopolyesters, a wide range of possible polymers are mentioned, including polyurethanes. US 2010/0136350 A1 (Kureha) discloses a gas barrier multilayer structure, having layer (A) including a polycarboxylic acid polymer and a silicon-containing compound, derived from a silane coupling agent; and layer (B) including multivalent metal compounds e.g. a zinc compound. A two coat system in which a polyvalent metal cation is coated over a polycarboxylic acid polymer is reported to provide a gas barrier. However, the gas barrier is only sufficiently achieved in the presence of a silane coupling agent such as tetramethoxysilane or aminopropyltrimethoxysilane, which is added to the polycarboxylic acid polymer as part of the first coat. The absence of a silane coupling agent results in a decrease of gas barrier even in the presence of a polyvalent metal cation as a second coat.

SUMMARY OF THE INVENTION

The present inventors have found that in a two-coat gas and moisture vapor barrier system including: (1) a first coat containing a polyurethane; and (2) a second coat containing a multivalent metal cation or other crosslinker, the two coatings produce a synergistic effect. The barrier properties of the polyurethane-containing coating are enhanced by presence of a second coating containing a multivalent metal cation or other crosslinker. Superior gas and moisture vapor barrier can advantageously be achieved at low film weight and without the need for inorganic laminar material fillers typically employed to boost barrier properties. Advantageously, the polyurethane includes acid groups, for example, incorporated into the backbone of the polyurethane. It has been found that acid groups can be utilised as functional groups for reaction with suitable crosslinkers, such as for example, polyvalent metal cations. Crosslinking results in coatings which exhibit good gas and moisture vapour barrier properties without the need to include inorganic laminar materials. The present inventors have further devised a new method of preparing barrier coatings in which a coating composition comprising a polyurethane resin is applied to a substrate to provide a first coating layer. Subsequently a second coating composition comprising a crosslinking agent, for example a multivalent metal cation, is applied over the first coating. The polyurethane resins advantageously form a template for the chelation of crosslinkers, which enhances the barrier properties of the two-coat coat system. The polyurethane may be applied as an aqueous dispersion or as solution in an organic solvent.

In a first aspect, the invention provides a two-coat barrier system comprising a first coating comprising a polyurethane and a second coating comprising a multivalent metal cation or other crosslinker. Advantageously, the first coating is a dispersion of polyurethane in water or an aqueous mixture containing a water-miscible solvent. Typically, the dispersion in water or an aqueous mixture is a dispersion of a neutralized polyurethane resin. Optionally, the first coating comprises a neutralizing agent. Alternatively, the two-coat barrier system of the first aspect of the invention may comprise: a first coating comprising a solution of polyurethane resin in an organic solvent, and a second coating comprising a multivalent metal cation or other crosslinking agent. For example, the two-coat barrier system of the first aspect of the invention may comprise: a first coating comprising a dispersion of polyurethane in an aqueous or water-miscible solvent or a solution of polyurethane in an organic solvent, and a second coating comprising a multivalent metal cation or other crosslinking agent. Advantageously, at least 10 wt % of the polyurethane is made up of urethane (—NH—C(O)—O—) groups, and urea (—NH—C(O)—NH—) groups if present. Advantageously, the polyurethane resin includes acidic functional groups, for example, as pendant acid groups attached to the polyurethane backbone. The two-coat system of the first aspect of the invention advantageously provides an oxygen transmission rate (OTR) at 90% RH and 23° C. of no more than 8 $cm^3/m^2/day$ and/or a moisture vapor transmission rate (MVTR) at 90% RH and 38° C. of no more than 15 $g/m^2/day$, when the first coating applied at a coating weight of no more than 12 $g/m^2$ to a substrate, such as a 12 μm thick corona surface treated biaxially orientated PET film.

In a second aspect, the invention provides a method of preparing a barrier layer comprising the step of applying a coating composition comprising a multivalent metal cation or other crosslinking agent onto a coating comprising a polyurethane.

Advantageously, at least 10 wt % of the polyurethane is made up of urethane and urea groups if present. Advantageously, the polyurethane includes acidic functional groups. The polyurethane is advantageously a water-dispersible polyurethane resin and/or a solvent-soluble polyurethane resin. The method of the second aspect of the invention may, for example, use the two-coat barrier system of the first aspect of the invention, the second coating comprising the multivalent metal cation being applied onto the first coating on a substrate. The method of the second aspect of the invention may, for example, be used to enhance the barrier properties of a coating comprising a polyurethane resin, such as a water-dispersible or solvent-soluble polyurethane. The method of the second aspect of the invention may optionally include the further step of applying the first coating of the first aspect of the invention onto a substrate and, optionally, curing the coating composition. For example, the method of the second aspect of the invention may further include the step of applying either a dispersion of polyurethane in an aqueous or water miscible solvent, or a solution of polyurethane resin in an organic solvent onto a substrate to form a polyurethane-containing coating.

In a third aspect, the invention provides a barrier layer including the product of combining a polyurethane resin and a multivalent metal cation or other crosslinking agent. For example, the invention provides a barrier layer combining the product of reacting a water-dispersible polyurethane wherein at least 10 wt % of the water dispersible polyurethane is made up of urethane groups, and urea groups if present, and a multivalent metal cation; or combining the product of reacting a solvent-soluble dispersible polyurethane containing acidic functional groups, and a multivalent metal cation. The barrier layer of the third aspect of the invention may, for example, be prepared from the two-coat barrier system of the first aspect of the invention or be prepared according to the method of the second aspect of the invention. The polyurethane resin present in the barrier layer of the third aspect of the invention is advantageously as defined for the first aspect of the invention.

In a fourth aspect, the invention provides a barrier material including a polyurethane resin, on a substrate, for example, a polymeric film. The barrier layer present in the barrier material of the fourth aspect of the invention may, for example, be the barrier layer of the third aspect of the invention. Advantageously, the barrier layer includes substantially no inorganic laminar filler materials, such as less than about 5 wt % inorganic laminar filler material. The barrier material may, for example, be included in a laminate. The barrier material of the fourth aspect of the invention may, for example, be incorporated into a packaging material, for example, in a laminate.

In a fifth aspect, the invention provides a coating composition suitable for use as the first coating of the two-coat barrier system of the first aspect of the invention. The coating composition of the fifth aspect of the invention advantageously comprises a solution of a polyurethane resin, which includes acidic functional groups, in an organic solvent. The coating composition optionally further includes one or more, preferably at least one, of a plasticizer, additional resins, dispersant, surfactant, softener, stabilizer, antiblocking agent, film forming agent, tackifier and adhesion promoter.

In a sixth aspect, the invention provides the use of a multivalent metal cation to enhance the barrier properties of a barrier layer comprising the polyurethane resin as defined in the first aspect of the invention, the use comprising the step of applying a coating composition comprising a multivalent metal cation or other crosslinker onto a coating layer comprising the polyurethane resin.

In a seventh aspect, the invention provides a system for enhancing the barrier properties of a coating layer comprising a polyurethane resin applied on a substrate according to the formula $A/(B \cdot C) > 2$, in which:

A=the oxygen transmission rate at 23° C. and 90% RH in g/m²/day for the coating layer;
B=the oxygen transmission rate at 23° C. and 90% RH in g/m²/day for a barrier layer including a multivalent metal cation or other crosslinker applied onto the coating layer; and
C=a coating weight in g/m² (dry) of the coating layer.

It has been found that there is no need to add inorganic laminar material fillers, such as clays, to the systems of the present invention in order to obtain barrier layers with good barrier properties. Without wishing to be bound to any theory, it is postulated that the free volume within the polymer network is significantly reduced by the combined effect of crosslinking the polyurethane and the chelation of the polyvalent metal cations to the backbone of the polyurethane. In the barrier layers of the invention, a penetrating molecule is forced to diffuse through the polyurethane/polyvalent metal cation network along a tortuous pathway, which for the purpose of this invention significantly reduces the coatings gas and moisture permeability.

DETAILED DESCRIPTION OF THE INVENTION

Polyurethanes

The term "polyurethane" refers to a polymer comprising multiple urethane (—NH—C(O)—O—) linkages within the backbone and, optionally, urea linkages (NH—C(O)—NH—) in the backbone. Polyurethanes that include urea linkages in addition or urethane linkages are sometimes referred to in the art as "polyurethaneureas". The term "polyurethane" as used herein generally encompasses both polyurethanes and polyurethaneureas. Typically, the number of urea linkages, when present, is less than the number of urethane linkages in polyurethanes of the invention. The polyurethane of the invention may include no urea linkages in some embodiments.

Advantageously, at least 10 wt % of the polyurethane present in the coatings of the first aspect and second aspects of the invention is made up of urethane groups, and urea groups if present. Typically, the total urethane and urea groups make up 20 to 65 wt % of the polyurethane. Advantageously, from 20 to 45% by weight of the polyurethane resin of the invention, especially from 25 to 40 wt % of the polyurethane resin of the invention, is made up of urethane and urea groups. It has been found that polyurethane resins having a proportion of urethane and urea groups described herein react rapidly with metal cation crosslinkers. Accordingly, they are suitable for use in the two-coat system of the invention with crosslinking occurring immediately following application of a coating layer comprising the polyurethane resins described above. In contrast, reaction of polyurethane resins used in two-pack coating systems of the prior art, where the polyurethane and the crosslinker are combined prior to application to a substrate, is much slower.

Preferably, polyurethane is water-dispersible or solvent-soluble. A water-dispersible polyurethane is a polyurethane resin which when neutralised forms a stable dispersion in water or a water-miscible solvent, especially a stable dispersion in water. The water-miscible solvent may be a blend of solvents, for example a blend of polar organic solvents, such as alcohols, especially methanol, ethanol and propanol. The blend of water-miscible solvents advantageously includes water. Preferably the water miscible solvent is an aqueous mixture including water and at least one water-miscible solvent. For example, the water-miscible solvent may be a mixture of water and an alcohol, such as ethanol. Advantageously, the polyurethane resin used in the invention forms a stable dispersion at a level of at least 5 g/l in a water-miscible solvent at 25° C. Preferably, at least 5 g/l of the water-dispersible polyurethane resin forms a stable dispersion in water at 25° C., for example, at least 20 g/l of the water-dispersible polyurethane resin forms a stable dispersion in water at 25° C. A dispersion is considered stable if the polyurethane remains dispersed in the continuous phase for at least 7 days. The dispersion is preferably a colloid with an aqueous or a water-miscible solvent as the continuous phase and the polyurethane as the dispersed phase. The dispersion may be an emulsion wherein the polyurethane dispersed phase is liquid or a sol wherein the polyurethane dispersed phase is a solid.

A solvent-soluble polyurethane resin is a resin that dissolves in an organic solvent or a blend of organic solvents, such as ketones, esters, alcohols and mixtures thereof. Typically, the solvent soluble polyurethane resin dissolves in an organic solvent that is not miscible in water. Preferably the solvent soluble polyurethane resin is soluble in methylethyl ketone or a mixture of methylethyl ketone and ethyl acetate, for example a 1:1 mixture of methylethyl ketone and ethyl acetate. Advantageously, the polyurethane resin used in the invention has a solubility of at least 5 g/l in an organic solvent or blend of organic solvents at 25° C. Preferably, the polyurethane resin used in the invention has a solubility of at least 5 g/l in 1:1 methyl ethyl ketone/ethyl acetate at 25° C., for example a solubility of at least 20 g/l in 1:1 methyl ethyl ketone/ethyl acetate. Polyurethane resins used in the invention typically have a solubility of 100 g/l or more in 1:1 methyl ethyl ketone/ethyl acetate at 25° C., for example a solubility of from about 400 to about 500 g/l or more in 1:1 methyl ethyl ketone/ethyl acetate at 25° C.

The polyurethane polymer used in the invention typically incorporates acid groups onto the backbone the polymer, for example, as pendent groups on the polyurethane chain. Any polyurethane with a backbone bearing acid functionality, such as a pendant carboxylate, sulphonate and phosphonate groups, with innate gas and moisture vapor barrier properties can be utilized. The acid groups can, advantageously, be utilized as functional groups for reaction with crosslinking agents, especially polyvalent metal cations. The pendant acidic groups present in the polyurethane resins of the invention may, for example, be selected from carboxylic acid groups, sulfonic acid groups and phosphonic acid groups, especially carboxyl groups, either as the free acids or in salt form. In water-dispersible polyurethanes, any acidic groups are preferably neutralized and are present in salt form. Polyurethane resins including carboxylic acid groups as the pendant acidic functional groups, preferably as carboxylate groups, have been found to be particularly suitable for use in coatings of the invention.

Preferably, the solvent-soluble polyurethanes include acidic functional groups, for example, as pendant acid groups attached to the polyurethane backbone. The present inventors have found that when acid groups are incorporated into the backbone of solvent-soluble polyurethanes, they can be utilised as functional groups for reaction with suitable crosslinkers, such as for example polyvalent metal cations.

In order to increase the dispersibility of a polyurethane resin in water, acidic groups present on the polymer backbone may be neutralized. Water-dispersible polyurethane resins of the invention, such as those present in aqueous solutions, are typically neutralized resins. Typically, at least 80% of acid groups are neutralized, and are present as the salt form. Advantageously, substantially all the acid groups are in salt form, for example at least 90%, especially at least 95% are in salt form. The polyurethane may optionally, include metal salt forms of the acid groups, such as Group 1 metal salts, for example, lithium, sodium or potassium salts, or amine salts, for example triethylamine or ammonium salts.

The number average molecular weight ($M_n$) of the polyurethane used in the invention is typically in the range of from about 800 to about 1000000, for example from about 800 to about 200000, especially from about 800 to about 100000.

Typically, the polyurethane of the invention, has an acid number of from 2 to 140 mg KOH/g. Advantageously, the acid value of the polyurethane is at least about 5, for example at least about 10, such as at least about 15, especially at least about 16 mg KOH/g. Advantageously, the acid value of the polyurethane is no more than about 100, for example no more than about 70, such as no more than about 60, especially no more than about 50, more especially no more than about 30 mg KOH/g. For example, the acid value of the polyurethane is in the range of from 10 to 70 mg KOH/g, especially from about 15 to about 30 mgKOH/g. Acid numbers are typically measured using ASTM D 974. The acid value of the polyurethane used in the invention may be selected from the range in which water dispensability may be imparted to the polyurethane.

Preparation of Polyurethanes

The principal components of the polyurethane resin can be formed according to any method known in the art, for example, but not limited to by reacting, e.g. by heating, isocyanates with polyols and, optionally, amine compounds. The reaction mixture typically includes functionalised polyols which include functional groups in addition to hydroxyl groups that enables polar groups and/or acid groups to be incorporated into the polyurethane backbone. In order for the polyurethane to be dispersible in water, the reaction mixture typically includes a dispersing component that increases the water dispersibility of the polyurethane. The dispersing component is typically a functionalised polyol, such as a polyhydroxy acid, which enables polar functional groups, such as acid functional groups, to be introduced into the polyurethane thereby enhancing the polarity of the polymer. In order for the polyurethane to participate in crosslinking reactions, the reaction mixture advantageously includes a reactive crosslinking component. Typically acid functionality is incorporated into the polyurethane to provide groups that participate in crosslinking reactions, for example with multivalent metal cations. The crosslinking component is typically a polyhydroxy acid, although other polyols or polyamies that include reactive groups may be used as a crosslinking component. Preferably, the dispersing component and/or crosslinking component enables acidic functional groups to be incorporated into the polymer. Alternatively, a polyurethane without acid functionality could be modified to have the acid functionality inserted, for example by removal of a protecting group from a masked acid functional group, such as by hydrolysis of an ester. The use of a polyhydroxy acid, i.e. a polyol that includes an acid functional group, in the reaction mixture has been found to be a particularly effective way of introducing acid groups into a polyurethane thereby increasing its polarity and/or providing reactive groups that can participate in crosslinking reactions.

The polyurethane resin may, for example, be formed by combining (A) an isocyanate with (B) a polyhydroxy acid, for example, until the desired NCO equivalent is achieved, for example until an isocyante value of about 0.076 mol equivalents is achieved. The reaction mixture may, optionally, further comprise (C) a polyol component and/or (D) a chain extension agent. Example of chain extension agents include amines, such as diamines. Unreacted NCO groups may remain in order to allow further reaction with chain extenders. The polyurethane resins of the invention can, for example, be prepared by reaction of the following: (A) polyisocyanate compound; (B) a polyhydroxy acid; and (C) a polyol compound. The polyol compound (C) does not include polyols which include functional groups in addition to hydroxyl groups. Optionally, at least one polyol present in the reaction mixture lacks an acid functional group. Thus, the polyurethane resins of the invention may, for example, be prepared by reaction of the following: (A) a polyisocyanate compound; (B) a polyhydroxy acid; and (C) a polyol component including one or more polyol compounds that lack an acid functional group. The concentration of acid functional groups in the polyurethane may, for example, be controlled by selecting an appropriate balance of (B) polyhydroxy acids and (C) polyols that lack acid functional groups. The polyurethane in the first coating of the first aspect of the invention is typically the reaction product of one or more diisocyanates, two or more polyols and, optionally, one or more amine chain extenders, wherein at least one of the polyols is a polyhydroxy acid (which functions as a dispersing component) and at least one of the polyols lacks an acid functional group. Advantageously, the ratio of (C) polyols that lack an acid functionality, to (B) polyhydroxy acids is in the range of from 1:5 to 5:1, especially in the range of from 1:4 to 4:1, for example in the range of from 1:4 to 1:1.

In one embodiment of the first aspect of the invention, the present invention provides a gas and moisture vapor barrier comprising a 2-coat system of a first coating of a water based polyurethane dispersion, having a urethane and urea group content of not less than 10% by weight, preferred total concentration of groups between 20-65%) prepared by reacting an aliphatic, aromatic or combinations thereof and a diisocyanate with a polyol and a dispersing component (e.g. an acid group).

The polyurethane resin suitable for use in the two-coat system of the first aspect of the invention, the method of the second aspect of the invention and the barrier layer of the fourth aspect of the invention is advantageously obtained by reacting (i) a polyisocyanate compound; (ii) a polyhydroxy carboxylic acid; (iii) a $C_2$-$C_{12}$ polyol; and optionally (iv) an amine chain extender. Advantageously, the polyisocyanate compound (i) is an aromatic aliphatic or alicyclic polyisocyanate and preferably at least 30 wt % of the total polyisocyanate content is such cyclic polyisocyanates. Advantageously, at least 90 wt % of the polyols present are $C_2$-$C_{12}$ polyols. Advantageously, the chain extender is at least one of ammonia, an ammonia derivative, a diamine, hydrazine or a hydrazine derivative. Particularly suitable polyurethanes for use in the invention are described in EP 1 674 529 A1, the content of which is incorporated herein by reference. For example, the resins of the present invention include those described in paragraphs [0016] to [0046] of EP 1 674 529 A1 and the water dispersible resins PUD1, PUD2, PUD3 and PUD4 described in paragraphs [0072] to [0075] of that document. Particularly suitable solvent soluble polyurethane resins for use in the invention are described in US 2005/0084686, the content of which is incorporated herein by reference. For example, the resins of the present invention include those described in paragraphs [0024] to [0038] of US 2005/0084686 A1 and the solvent soluble prepolymers to example resins PUD1, PUD2, PUD3 and PUD4 described in paragraphs [0066] to [0073] of that document.

The synthesis or production of polyurethanes is not limited to a specific process and should be familiar to those skilled in the art. Common techniques for producing a polyurethane resin, such as acetone, acetonitrile and methylethyl ketone approaches or a pre-polymer approach may be employed. Reaction of (A) an isocyanate compound; (B) polyhydroxy acid; (C) and if necessary a polyol compound, typically takes place under an inert atmosphere and in an inert solvent which should preferably be a water soluble organic solvent, producing a pre-polymer having terminal isocyanate groups. The pre-polymer is preferably neutralized with a neutralizing agent, and dispersed or dissolved in an aqueous medium and chain extended. At this stage of the process, the neutralization agent, such as ammonia, may simultaneously serve as the blocking agent, thereby delivering the final aqueous polyurethane, after removal of any volatiles, at number average molecular weights of 500 to 10000. Alternatively, after neutralization of the pre-polymer, which is dispersed or dissolved, a chain extension agent may be added and after removal of any volatiles, an aqueous polyurethane with number average molecular weights in the range of 500 to 1000000 being delivered, for example in the range 700 to 600000, and especially in the range 700 to 500000. Typically water soluble organic solvents used in the production of the pre-polymer include acetone, acetonitrile and methylethyl ketone. Catalyst may also be used for polyurethane synthesis, such as tin compounds, amines, zinc compounds and the like. The soluble polyurethane can, for example, be prepared according to the procedure described below to produce example polyurethane PU 1-4 (or any other method of polyurethane synthesis known in the art).

(A) Isocyante Compound.

Suitable isocyanates include polyisocyanates, especially diisocyanates. Any aliphatic, alicyclic, aromatic or araliphatic isocyanate either singly or in combinations can be used for the present invention. Typically aliphatic or aromatic diisocyanate or combinations thereof are used. Examples include, but are not limited to, cyclohexyl diisocyante (CHDI); 1,4 cyclopentane diisocyante; 1,3 cyclopentane diisocyante; isophorane diisocyanate (IPDI); dicylohexylmethane 4,4'-diisocyanate ($H_{12}$MDI); Norbornane diisocyanate (NBDI); m-tetramethylxylylene diisocyanate (m-TMXDI); p-tetramethylxylylene diisocyanate (p-TMXDI); 1,2-diisocyanatopropane; 1,3-diisocyanatopropane; 1,6-diisocyanatopropane (hexamethylene diisocyanate or HDI); 1,4-butylene diisocyanate; lysine diisocyanate; 1,4-methylene bis-(cyclohexyl isocyanate); 1,3-methylene bis-(cyclohexyl isocyanate) toluene diisocyanate (TDI) and its mixtures; m-xylylene diisocyanate (mXDI); p-xylylene diisocyanate (pXD1). m- or p-phenylene diisocyanate and its mixtures; 4,4'-diphenyl diisocyanate; 1,5-naphthalene diisocyanate (NDI) 4,4'-; 2,4'- or 2,2'-diphenylmethane diisocyanate and its mixtures (MDI); 4,4'-toluidine diisocyanate (TODI); 4,4'-diphenylether diisocyanate; trimethylene diisocyanate; hexamethylene diisocyanate (HDI); pentamethylene diisocyanate; 1,2-, 2,3-, or 1,3-butylene diisocyanate; 4,4'-, 2,4'- or 2,2'-dicyclohexymethane diisocyanate and its mixtures (hydrogenated MDI); methyl-2,6-cyclohexane; methyl-2,4-cyclohexane 2,4,4- or 2,2,4-trimethylhexamethylene diisocyante; and 2,6-diisocyanatemethyl caproate. From a viewpoint of reducing free volume between polymer chains and reducing steric hindrance as a result of intermolecular interactions, it is preferred that when the isocyanate, for example the diisocyante, has substituents in its ring, that they should preferably be short, for example $C_{1-3}$ alkyl groups. Advantageously the polyurethanes are prepared using an aromatic diisocyanate (e.g. TDI, MDI and NDI); an araliphatic diisocyanate (e.g., XDI, and TMXDI); and an alicyclic diisocyanate, for example IPDI; hydrogenated XDI; and hydrogenated MDI; either singly or in combination. It has been found that polyurethanes exhibiting gas and moisture vapor barrier properties typically comprise aromatic diisocyanates, aralphatic diisocyanate and alicyclic diisocyanates either singly or in combination.

(B) Dispersing/Crosslinking Component.

The dispersing component is a compound comprising reactive groups such as alcohol or amine groups that enable the compound to be incorporated into a polyurethane backbone together with polar functional groups, especially acid functional groups such as carboxylic acid groups which become incorporated into the polyurethane as pendent acid groups. Typically the dispersing component is a polyhydroxy acid. The crosslinking component is a compound comprising reactive groups such as alcohol or amine groups that enable the compound to be incorporated into a polyurethane backbone together with further reactive functional groups that are able to participate in crosslinking reactions, for example with metal cation crosslinkers, Particularly suitable crosslinking groups are acid functional groups such as carboxylic acid groups which become incorporated into the polyurethane as pendent acid groups. Typically the crosslinking component is a polyhydroxy acid. The dispersing component and the crosslinking component may be the same compound which has a dual purpose of providing polarity to the polyurethane and providing functional groups which participate in cross linking reactions. Polyhydroxy acids contain hydroxyl groups that can react with isocyantes and thereby be incorporated in the polyurethane as acid groups which can enhance the polarity of the resin, especially when neutralized, and provide acid functionality to polyurethane resins which can participate in crosslinking reactions. As mentioned above, advantageously, at least one of polyols used to prepare the polyurethanes of the invention is a polyhydroxy acid that includes an acid functional group. The acid functionality of the polyurethane is preferably incorporated into the polymer via inclusion of polyhydroxy acid (e.g. carboxylic acid, sulfonic acid, phosphonic acid either singly or in combination in the reaction mixture. Examples of the polyhydroxycarboxylic acid (preferably a dihydroxycarboxylic acid) include dihydroxy$C_{2-10}$alkanecarboxlyic acids, such as dimethylolpropionic acid and dimethylolbutanoic acid; a dihydroxy$C_{4-10}$alkane-polycarboxlyic acids or dihydroxy$C_{4-10}$alkene-polycarboxlyic acids; dihydroxy$C_{6-10}$arene-carboxlyic acids, such as 2,6-dihydroxybenzoic acid; and others. These polyhydroxy acids may be used in the form of a salt, typically an ammonium salt, an amine salt (e.g. trialkylamine salt), and a metal salt (e.g. a sodium salt).

(C) Polyol Component

The polyol component should preferably comprise diols with low molecular weight from a barrier perspective. The molecular weight, i.e. relative molecular mass ($M_r$) in unified atomic mass units, of the polyol component is advantageously less than 700, for example, less than 350, especially less than 250. The polyol has a molecular weight of at least 48, the relative molecular mass of methanediol. Typically, the polyol component includes or consist of polyols having a molecular weight ($M_r$) of from about 50 to 700, for example from about 50 to 350, especially from about 50 to 250. The polyols typically include or consist of $C_2$-$C_{12}$ polyols, for example, $C_2$-$C_{12}$ diols, especially $C_2$-$C_{10}$ polyols, for example, $C_2$-$C_{10}$ diols. Hard domains and reduction in overall free volume within the polyurethane are desirable. The polyol (e.g. diol) component preferably contains an alkylene glycol including a $C_2$-$C_{12}$ straight or branched chains. Polyols and can be used singly or in combination. Example polyols include, but are not limited to aliphatic glycols, for example ethylene glycol, propylene glycol, trimethylene glycol, 1,2-butanediol, 1,3-butanediol, 1,4-butanediol, 1,5-pentanediol, 3-methyl-1,5-pentanediol, 2,4-diethyl-1,5-pentanediol, 2,2,4-trimethylpentane-1,3-diol, 1,6-hexanediol, neopentyl glycol, 1,5- or 1,7-heptanediol, 1,8-octanediol; 1,9-nonanediol, 1,10-decanediol, 1,11-undecanediol and 1,12-dodecanediol; polyetherdiols, such as polyoxy$C_2$-$C_4$alkylene glycols, for example, diethylene glycol, triethylene glycol, tetraethylene glycol, pentaethylene glycol, hexaethylene glycol, heptaethylene glycol, dipropylene glycol, tripropylene glycol, tetrapropylene glycol, hexapropylene glycol, heptapropylene glycol, dibutylene glycol, tributylene glycol and tetrabutylene glycol; araliphatic diols as well as aromatic diols, for example bisphenol A, bishydroxyethyl terephthalate, catechol, resorcin, hydroquinone and 1,3- or 1,4-xylylenediol and its mixtures; alicyclic diols, for example, hydrogenated bisphenol A, hydrogenated xylylenediol, cyclohexanediol and cyclohexane-dimethanol; polyesterdiols such as addition products of the low molecular weight diols and lactones and reaction products of the low molecular weight diols and dicarboxylic acids; polycarbonatediols, for example, reaction products of the low molecular weight diols and short chain dialkyl carbonates; alicyclic diols, for example $C_5$-$C_{12}$ alicyclic diols containing a $C_5$-$C_{10}$ alicyclic ring.

Advantageously, low molecular weight diols, such as a $C_2$-$C_{10}$ diol, for example, ethylene glycol, propylene glycol, butanediol, pentanediol, hexanediol, heptanediol, octanediol, diethylene glycol, triethylene glycol, tetraethylene glycol, and dipropylene glycol, are used, either singly or in combination, to prepare the polyurethane resins of the invention. $C_2$-$C_6$ diols including ethylene glycol, 1,2- or 1,3 propylene glycol, 1,4-butanediol, 1,6-hexanediol, 3-methyl-1,5-pentanediol, diethylene glycol, triethylene glycol, dipropylene glycol either singly or in combination have been found to be particularly suitable. Low molecular weight diols, that is diols having a molecular weight ($M_r$) of less than 700, for example, less than 350, especially less than 250, have been found to provide coatings with advantageous gas and moisture vapor barrier properties.

The features of the polyols described above are applicable both to (C) any optional polyols that lack an acid functional group and also to (B) polyhydroxy acids used as crosslinking and/or dispersing components. Thus, (B) polyhydroxy acids are advantageously short-chain/low molecular weight polyols, for example, of 12 carbon atoms or less and/or a molecular weight of less than 700.

The use of short-chain/low molecular weight polyols in the polyurethane resins of the invention has been found to contribute to ability of the resins to create a good barrier. For example, when polyurethanes are used that have polyol components of 12 carbon atoms or less and/or a molecular weight of less than 700, improved barrier properties are observed.

(D) Chain Extension Agent

The polyurethane can be chain extended if any terminal isocyanate groups remain. A chain extender agent can either be used singly or in combinations and can be used according to the present invention. Suitable chain extenders include amines, such as diamines, especially bifunctional compounds, such as secondary diamines and mono- or multifunctional primary amines. Examples include, but are not limited to, nitrogen containing compounds having an active hydrogen atom; ammonia; ammonia containing derivatives; ethylamine; isopropylamine; N-methylethanolamine; diamine and hydrazine and hydrazine derivatives include in addition to hydrazine, as aliphatic diamines; ethylenediamine; trimethylenediamine; tetramethylenediamine; pentamethylenediamine; hexamethylenediamine; propylenediamine; 2,2,4-trimethylhexamethylenediamine; 2,4,4-trimethylhexamethylenediamine and octamethylenediamine. As aromatic amines, m or p-phenylenediamine; 1,3- or 1,4-xylylenediamine or its mixtures. As an alicyclic diamine, a hydrated xylylenediamine, bis(4-aminocyclohexyl)methane, isophoronediamine, bis(4-amino-3-methylcyclohexyl)methane. Any hydroxyl group containing diamine, 2-hydrazinethanol, 2-(2-aminoethyl) amino ethanol, 2-hydroxyethylaminopropylamine or other diamine having a hydroxyl, γ-(2-aminoethyl)aminopropyl dimethyloxysilane; γ-(2-aminoethyl)aminopropyl trimethoxysilane; or other silane coupling agent having a silicon in its molecule may be used. Advantageously, a chain extender of no more than 9 carbon atoms, for example from 2 to 9 carbon atoms, especially from 2 to 7 carbon atoms, is employed. It has been found that the use of low molecular weight chain extenders in the polyurethane synthesis results in coatings with good gas and moisture vapor properties.

Neutralization of Polyurethanes

For some applications it may be desirable to neutralize acid groups or other anionic hydrophilic groups present in the polyurethane. Neutralization of a polyurethane acid groups or other anionic hydrophilic group is achieved with a neutralizing agent either singly or on combination. Advantageously, the polyurethane is combined with a neutralizing agent, for example in the first coating of the two-coat system of the first aspect of the invention. A conventional base can be utilized as a neutralizing agent, such as ammonia; ammonia containing derivatives; ethylamine; isopropylamine; tertiary amines (e.g. trialkylamine such as trimethylamine, triethylamine, tripropylamine); an alkanolamine, such as dimethylethanolamine, methyldiethanolamine, triethanolamine, triisopropanolamine; and heterocyclic amines such as morpholine, methylmorpholine and others, etc. Other means for neutralization of a polyurethane acid group would be known to those skilled in the art. It is preferable for the neutralization agent to be a volatile base, such as a $triC_{1-3}$ alkylamine, e.g. triethylamine, a volatile amino alcohol, e.g. dimethylethanolamine, or, especially, ammonia.

Neutralization often increases the water dispersibilty of the resins. When the polyurethane is used as an aqueous dispersion, acid groups or other anionic hydrophilic groups present in the polyurethanes of the invention, such as acid functionality introduced via the incorporation of a polyhydroxy acid dispersing component into the polyurethane backbone, are advantageously neutralized, thereby increasing the water dispersibility of the resin. Typically, at least 80% of the acid functional groups present in the polyurethanes used in the aqueous dispersions invention are in neutralized salt form. Thus, the coating compositions and two-coat systems of the invention that include dispersions of polyurethane resins in aqueous or water-miscible solvents typically include a neutralizing agent that neutralizes the polyurethane resins. For example, the polyurethanes are present as salt, have a neutral or alkaline pH and/or coating compositions include a base. Typically, the water-dispersible polyurethane resins include acid functional groups in their salt form.

Neutralization is often unnecessary for solvent-soluble urethane resins, which are typically used as free acids. Thus, the coating compositions and two-coat systems of the invention that include solutions of polyurethanes in organic solvents typically include the polyurethanes as free acids, have an acidic pH and/or do not include a base.

End Blocking Agents

End blocking agents used in a polyurethane synthesis can form part of the isocyanate residue and/or can be used to terminate any reactive isocyante groups of the urethane pre-polymer. End blocking agents can be used to control the molecular weight of the polyurethane polymer. For example end blocking agents can be used to limit the molecular weight of the polyurethanes to a number average molecular weight ($M_n$) in Daltons within the range of from 500 to 10000. Furthermore, end blocking agents can also be used as the neutralization agent simultaneously. Examples of end blocking agents that can also be utilized as neutralizations are familiar to those skilled in the art and include, for example, primary amine compounds such as ammonia; methylamine; dimethylamine; ethylamine; diethylamine; isopropylamine; hydroxylamine; monoethanolamine; secondary amine compounds such as 2-amino-2-hydroxymethylpropane-1,3-diol; 3-amino-1-propanol; diethylamine; diisopropylamine; N-methylethanol and the like. Ammonia is preferred as the end blocking agent and the neutralization agent simultaneously, due to its volatility and reactivity with an isocyanate residue and/or isocyanate group part of the urethane pre-polymer, and its ease of neutralizing polyurethane acid groups or other anionic hydrophilic groups.

First, Polyurethane-Containing, Coating

Advantageously, the first coating of the two-coat system of the invention is a coating composition that is ready to apply to a substrate. Alternatively the first coating of the two-coat system may, for example, be let down with a diluent, such as a solvent, prior to application to the substrate. The first coating of the two-coat systems of the first aspect of the invention that includes a dispersion of a polyurethane or a solution or polyurethane in an organic solvent can be applied to a substrate using virtually any known method of deposition (e.g. roller coating, spraying, dipping, brushing, gravure, flexography, lithography, screen, etc.) to provide a coating. Coating compositions including the polyurethane resin typically have a viscosity of 10 to 200 mPa·s at 25° C. or 17-60 seconds Zahn cup #2 at 25° C. For example, the water based polyurethane dispersions advantageously have an application viscosity of approximately 18 seconds (Zahn Cup 2). This viscosity is suitable for flexo and gravure printing applications. If necessary, the viscosity can be adjusted by changing the concentration of the polyurethane either during the synthesis or post synthesis, and depending on coating application method, the desired application viscosity can be achieved. For example, the viscosity can be adjusted at the dispersion stage, by adjusting the amount of deionized water. Similarly, the viscosity of a solution of resin in an organic solvent can be adjusted by adding or evaporating organic solvent. Alternatively, the two-coat system can utilize an existing water based polyurethane dispersion (for example a commercially available material) that is either used as supplied or modified to have the appropriate viscosity for the associated method of deposition. The water-based coating compositions of the invention that include water as a principal liquid vehicle may also include a water miscible organic solvent. Coating compositions also advantageously include additives such as plasticizers, other resins, dispersants, surfactants, softeners, stabiliziers, anti-blocking agents, film-forming agents, tackifiers and adhesion promoters.

The first coating is, for example, a water-based polyurethane dispersion. In addition to the water dispersible polyurethane and water, the water-based polyurethane may, optionally, include further components. Alternatively, the first coating is a solution of a solvent soluble polyurethane in an organic solvent. In addition to the solvent soluble polyurethane and an organic solvent, the polyurethane solution may, optionally, include further components. The first coating may, for example, be a coating composition of the fifth aspect of the invention that comprises a solution of a polyurethane resin, which includes acidic functional groups, in an organic solvent. Suitable organic solvents include ketones, alcohols and esters, such as acetone, ethyl acetate, ethanol, isopropyl alcohol, n-propanol, propyl acetate, and N-methylpyrrolidone.

The coating compositions, especially the coating compositions that include a solvent soluble polyurethane resin dissolved in an organic solvent, also advantageously include one or more of a plasticizer, additional resin, wax, dispersant, surfactant, softener, stabilizer, anti-blocking agent, anti-static agent, film forming agent, tackifier and adhesion promoter, especially one or more of a plasticizer, anti-blocking agent, adhesion promoter, anti-static agent or wax. For example, the coating composition may comprise an organic solvent and one or more of a plasticizer, dispersant or surfactant and adhesion promoter. Other additives known to those in the art may also be included in water-based or solvent-based coating compositions. Providing the gas and moisture vapor barrier are not significantly impaired, the barrier coatings of the present application may optionally include additives. Such additives may include antioxidants, weathering agents, heat stabilizers, thickeners, UV absorbers, oxygen scavengers, oxygen sensors, colorants and the like. These may, for example, be included in amounts of up to 30% with respect to the total weight of the barrier coating. In the case of colorants, the amount used may be higher. Suitable colorants include, but are not limited to organic or inorganic pigments and dyes. The dyes include but are not limited to azo dyes, anthraquinone dyes, xanthene dyes, azine dyes, combinations thereof and the like. Organic pigments may be one pigment or a combination of pigments, such as for instance Pigment Yellow Numbers 12, 13, 14, 17, 74, 83, 114, 126, 127, 174, 188; Pigment Red Numbers 2, 22, 23, 48:1, 48:2, 52, 52:1, 53, 57:1, 112, 122, 166, 170, 184, 202, 266, 269; Pigment Orange Numbers 5, 16, 34, 36; Pigment Blue Numbers 15, 15:3, 15:4; Pigment Violet Numbers 3, 23, 27; and/or Pigment Green Number 7. Inorganic pigments may be one of the following non-limiting pigments: iron oxides, titanium dioxides, chromium oxides, ferric ammonium ferrocyanides, ferric oxide blacks, Pigment Black Number 7 and/or Pigment White Numbers 6 and 7. Other organic and inorganic pigments and dyes can also be employed, as well as combinations that achieve the colors desired.

The overall solid content (w/w) of the coating composition comprising the polyurethane resin is typically between 0.5-50%, preferably 5-40%, for example, 15-35% or 5-31%, especially 15-31%.

The pH of the aqueous polyurethane resin dispersion can be 7-14, preferably 8-13. Typically the pH of the water-dispersible polyurethane resin is in the range 8-11. Advantageously, the water-dispersible resin is a neutral resin and a dispersion of the resin in water, for example for use as the first coating of the two-coat system of the invention or the coating composition of the invention has a pH in the range of from about 6 to about 12, typically from about 6.5 to about 11, for example from about 7 to about 11. All pH values quoted herein are measured at 25° C.

In one embodiment of the invention there is provided a coating of solvent soluble polyurethane resin, preferably having a urethane and urea group preferably of not less than 10% by weight (preferred total concentration of groups between 20-65%) preferably prepared by reacting an aliphatic or aromatic diisocyanate (or combination thereof) with a reactive functionality such as for example a polyol, polyamine and polyhydroxy acids (e.g. carboxylic acid, sulfonic acid, phosphonate/phosphonic acid polyhydroxy acid group component).

Second, Crosslinker-Containing, Coating

In addition to a first coating comprising the polyurethane of the invention, the two-coat system of the first aspect of the invention includes a second coating, which includes a cross-linking agent, typically a multivalent metal cation.

A multivalent metal cation is a metal ion with a formal charge of +2 or more, for example +2, +3 or +4. Suitable multivalent metal cations include alkaline earth metals such as beryllium, magnesium, calcium; and transition metals, such as titanium, manganese, iron, cobalt, copper, nickel, zirconium, chromium, zinc and aluminum and silicon and their oxides, carbonates and the like. Zinc ($Zn^{2+}$) cations are particularly preferred and the second coating advantageously includes zinc oxide, zinc carbonate or another zinc salt. The multivalent metal cation may be used in conjunction with an additive, e.g. a surfactant, such as commercially available Pluronics, Tetronics, Tritons, BYK, Tergitol and the like. Advantageously, additive maintains the metal cation is solution or suspension. Although not restricting the invention to a particular theory, it is possible that the superior barrier performance is a synergistic combination of two events, (1) a crosslinking mechanism between multivalent metal cations with the acid groups of the solvent soluble polyurethane and (2) a secondary chelation between multivalent metal ions and the backbone of the urethane groups of the polyurethane.

The second, multivalent metal ion-containing, coating is preferably applied over the first polyurethane containing coating. Although a single polyurethane-containing coating and a single multivalent metal ion-containing coating may be applied, alternatively multiple layers of one or both of the coatings may be applied in any order. For example, a barrier layer of the invention may include two or more two-coat systems of the invention including alternating layers of polyurethane-containing coatings and multivalent metal ion-containing coatings. The second coating typically includes a liquid vehicle in which the multivalent metal ions are dispersed or dissolved and optionally a surfactant or other additive. The multivalent metal cations are typically dissolved in the second coating composition. The second coat of the two-coat system is preferably a solution of multivalent metal cations, for example, a solution of zinc cations. The second coating composition is typically a water-based composition and the liquid vehicle is principally water, although organic solvent may also be used as the principal liquid vehicle or be included as a minor component of a predominantly water-based vehicle.

The overall solids content of the second coating containing the metal cation or other crosslinker is typically between 0.5-50%, preferably 15-30%, for example 2-25%, especially 20-25%. Advantageously, the multivalent metal cation or other corsslinker is present in the second coating at a level of between 0.5-50%, preferably 15-30%, for example 2-25%, especially 20-25%. The crosslinker in the second coating is advantageously applied at a coating weight of 20 $g/m^2$ or less, for example 15 $g/m^2$ or less, especially 10 $g/m^2$ or less. It has been found that coating weights of about 6 $g/m^2$ or less for the crosslinker are sufficient to substantially enhance the barrier performance of a polyurethane coating.

Barrier Systems, Layers and Materials

The two-coat system of the first aspect of the invention includes a first coating comprising a polyurethane resin and a second coating comprising a crosslinker. The system of the first aspect of the invention advantageously includes (i) a first coating comprising an aqueous dispersion of water dispersible polyurethane or a first coating comprising a solution of a solvent soluble polyurethane in an organic solvent; and (ii) a second coating comprising a multivalent metal cation.

The first coating and the second coating are for independent application to a substrate. Typically the first coating is applied to the substrate first and the second coating is then applied onto a layer of the first coating, although the reverse order is also possible. The first coating is, advantageously, supplied in a first pack, for example as a coating comprising a dispersion of a polyurethane in water or a solution of a polyurethane in an organic solvent, and the second coating is, advantageously, supplied in a second pack, for example as a coating composition comprising the metal ion and a liquid vehicle. In addition to the two coatings, the system of the first aspect of the invention may include instructions outlining how the system is to be used. For example, those instructions may describe the use of the two-coat system of the first aspect of the invention in the method of the second aspect of the invention and or describe how to prepare the barrier layer of the third aspect of the invention.

When preparing a two coat barrier system, it has been found to be advantageous for the polyurethane to react rapidly with metal cations. Rapid reaction facilitates handling of the substance including the barrier coating. Furthermore, rapid reaction is advantageous as the metal cation must react quickly before the liquid vehicle evaporates and/or any additives that maintain the crosslinker in solution or suspension evaporate. The use of volatile additives, such as ammonia to maintain metal cations in solution and/or suspension is advantageous as they are not retained in the barrier layer once formed. However, if a volatile additive is used, the crosslinker must react quickly with the polyurethane before the additives ceases be in sufficient quantities to function due to evaporation. Polyurethanes, such as those described herein, especially those with the proportion of urethane/urea groups described herein and/or low molecular weight/short chain polyol components described herein, have been found to react rapidly with metal cations. Accordingly, effective two-coat systems are provided by the invention in which a rapid crosslinking reaction occurs between the polyurethane in the first coating and the metal cations in the second coating. In contrast, polyurethanes used in known one-coat, two-pack systems react slowly with metal cations and other crosslinkers. Whilst that enables the polyurethane and the crosslinker to be mixed prior to application to a substrate without gelling immediately, it does not allow the crosslinker to be applied as a separate coating composition.

One embodiment of the present application is a two-coat gas and barrier system based on (1) a first coat comprising a water dispersible polyurethane with innate gas and moisture vapor barrier properties possessing a reactive functionality for crosslinking reactions (reactive functionalities can include for example polyhydroxy acids such as, either a carboxylic acid, sulfonic acid, phosphonate/phosphonic acid and the like); and (2) a second coat comprised of one or more multivalent metal cations.

The system of the invention typically provide excellent barrier when surface coated or integrated into plastic laminates with good laminate bond strengths.

It has been found that no particulates, such as layered inorganic materials, are required to enhance gas and moisture vapor barrier properties of the barrier. Advantageously, no more than 10 wt % of the solid content of the two-coat barrier system or barrier layer of the invention is inorganic laminar materials, preferably no more than 5 wt %, and especially no more than 2 wt %. The two-coat barrier system of the first aspect of the invention and barrier layer of the third aspect of the invention is advantageously substantially free from inorganic laminar compounds and for example, includes no more than 1 wt % of inorganic laminar compounds. Laminar or layered inorganic compounds are platy, or plate-like, fillers typically used in barrier coatings to provide a tortuous path for the diffusion of gases. Such inorganic materials typically have a high aspect ratio, for example an aspect ratio of greater than about 20 in its exfoliated form, such as between 20 and 10,000. Advantageously, no more than 10 wt % of the solid content of the two-coat barrier system of the invention is inorganic laminar materials with an aspect ratio of greater than about 20, preferably no more than 5 wt %, more preferably no more than 2 wt %, especially no more than 1 wt % of inorganic laminar compounds with an aspect ratio of greater than about 20. Advantageously, no more than 10 wt % of the solid content of the two-coat barrier system, coating composition or barrier layer of the invention is a nanoparticulate material, preferably no more than 5 wt %, more preferably no more than 2 wt %, especially no more than 1 wt % of a nanoparticulate material. Nanoparticulate materials have at least one dimension in the nanometer range, i.e. of less than 100 nm. The two-coat system has been found to provide exceptional gas and moisture vapor barrier properties without the need for fillers (for example Cloisite Na+, Microlite 963 and Somasif ME100 and the like) at 0-100% RH, especially 0-90% RH for oxygen transmission and for moisture vapor transmission respectively, on any surface print, article or laminate structure.

The two-coat barrier system of the first aspect of the invention and the barrier layer of the third aspect of invention advantageously provides an oxygen transmission rate (OTR) at 90% RH and 23° C. of no more than 8 $cm^3/m^2/day$, preferably no more than 6 $cm^3/m^2/day$, especially no more than 5 $cm^3/m^2/day$, and/or a moisture vapor transmission rate (MVTR) at 90% RH and 38° C. of no more than 15 $g/m^2/day$, preferably no more than 12 $g/m^2/day$, especially no more than 10 $g/m^2/day$ wherein the coating weight of the polyurethane resin is no more than 12 $g/m^2$, for example, after deposition on a substrate, such as when applied to a 12 μm thick corona surface treated biaxially orientated PET film. Advantageously, the two-coat barrier system of the first aspect of the invention provides and the barrier layer of the third aspect of the invention has an OTR<6 $cm^3/m^2/day$ at 90% RH and 23° C., and an MVTR<10 $g/m^2/day$ at 90% RH and 38° C. after deposition on a substrate. Similarly, the barrier material of the fourth aspect of the invention advantageously has an OTR<6 $cm^3/m^2/day$ at 90% RH and 23° C., and an MVTR<10 $g/m^2/day$ at 90% RH and 38° C. Advantageously, the above barrier properties are obtained when the film weight of the polyurethane coating is no more than 10 $g/m^2$, preferably no more than 8 $g/m^2$, especially no more than about 7 $g/m^2$, for example from about 4 to about 6 $g/m^2$. Advantageously, the above barrier properties are obtained when the film weight of the metal cation or other crosslinker is no more than 10 $g/m^2$, preferably no more than 8 $g/m^2$, especially no more than about 7 $g/m^2$, for example from about 4 to about 6 $g/m^2$. It has been found that, using the two-coat system of the invention, superior gas and moisture vapor barrier can be achieved at low film weight and without the need for platy fillers typically employed to boost barrier properties. The barrier layer of the invention has been found to exhibit good barrier properties without the need for platy particulates. Advantageously, the two-coat barrier system of the first aspect of the invention, and therefore also the barrier layer of the third aspect of the invention and the barrier material of the fourth aspect of the invention is substantially free from inorganic laminar compounds. Preferably, no more than 10 wt %, more preferably no more than 5 wt %, especially no more than 2 wt %, of the solid content of the two-coat system or barrier layer is inorganic laminar materials.

The two-coat system, coating composition or barrier layer of the invention can be applied to any surface or article that will receive the coating, including those that require pretreatment as is the case with some polymeric substrates. By adjusting the two distinct components of the two-coat system (e.g. viscosity and rheology adjustments et al), the coatings can be applied to any surface or article according to any method known in the art, without limitation, for example roller coating, spraying, dipping, brushing, gravure, flexography and the like. Substrates coated with the two-coat system are suitable for many end-use applications, for example packaging of perishable foods, gas or moisture sensitive materials, electronic components and others. A preferred use of the coatings of the invention is on non-metalized substrates, such as Mylar 800, Mylar 813, OPA (Nylon) and MB400 (OPP), however the two-coat system and barrier layers are not limited to any particular surface, substrate or article. Substrates coated with the two-coat system, coating composition or barrier layer of the invention are suitable for many end-use applications, for example packaging of perishable foods, gas or moisture sensitive materials, electronic components and others.

The barrier layer of invention typically includes the product of combining a water-dispersible polyurethane or a solvent-soluble polyurethane and a multivalent metal cation. For example, the barrier layer may include the product of combining a polyurethane and a multivalent metal cation, wherein at least 10 wt % of the polyurethane is made up of urethane groups, and urea groups if present, The polyurethane may react when combined with the polyvalent metal cations, for example, in a crosslinking reaction, and the product of combining the polyurethane and the multivalent metal cation may be a reaction product. Alternatively or additionally, the polyvalent metal cations may chelate with polyurethane and the product of combining the polyurethane and the multivalent metal cation may be composition in which the polyvalent metal cations are chelated to the backbone of the polyurethane.

In a sixth aspect, the invention provides the use of the second coating to enhance the barrier properties of a coating layer of the first coating, the use including the step of applying the second coating onto the first coating on a substrate. Advantageously, the step of applying the coating composition comprising a multivalent metal cation or other crosslinker reduces the oxygen transmission (OTR) at 90% RH and 23° C. in cc/m²/day of the coating layer by at least 20%, preferably by at least 40% and especially by at least 60% and/or reduces the moisture vapor transmission (MVTR) at 90% RH and 38° C. in g/m²/day of the coating layer by at least 10% preferably by at least 20% and especially by at least 30%. Advantageously, the step of applying the coating composition comprising a multivalent metal cation or other crosslinker results in at least a 4-fold reduction in the oxygen transmission rate (OTR) at 90% RH and 23° C. in cm³/m²/day, for example at least a 6-fold reduction in the oxygen transmission rate (OTR) at 90% RH and 23° C. in cm³/m²/day, especially at least an 8-fold reduction in the oxygen transmission rate (OTR) at 90% RH and 23° C. in cm³/m²/day; and/or results in at least a 2-fold reduction in the moisture vapor transmission (MVTR) at 90% RH and 38° C. in g/m²/day, for example at least a 3-fold reduction in the moisture vapor transmission (MVTR) at 90% RH and 38° C. in g/m²/day, especially at least a 4-fold reduction in the moisture vapor transmission (MVTR) at 90% RH and 38° C. in g/m²/day, of the coating layer. The above reductions in OTR and/or MVTR may, for example, be obtained when using a 12 µm thick corona treated film biaxially orientated PET film, such as, for example Mylar 800 PET film. The OTR and/or MVTR may, for example, be reduced by the above percentages when a 6 g/m² coating of crosslinker is applied, for example, applied as an aqueous coating using a #1 K-bar.

The use of the sixth aspect of the invention and the system of the seventh aspect of the invention advantageously enhances the barrier properties of a coating layer comprising polyurethane resin such that:

$$A/(B \cdot C) > 2, \text{ in which:}$$

A=oxygen transmission rate at 23° C. and 90% RH in g/m²/day for a barrier material comprising a substrate coated with a coating layer comprising a polyurethane resin;
B=oxygen transmission rate at 23° C. and 90% RH in g/m²/day for the barrier material further comprising a multivalent metal cation or other crosslinker applied onto the coating coating; and
C=coating weight in g/m² (dry) of the coating layer comprising the polyurethane resin.

Preferably $A/(B \cdot C) > 2.5$. More preferably, $A/(B \cdot C) > 5$, for example $>10$.

The above OTRs may, for example, be obtained when using a 12 µm thick corona treated film biaxially orientated PET film, such as, for example Mylar 800 PET film. The OTR value B may, for example, be obtained subsequent to the application of a crosslinker at a coating weight of 10 g/m² or less, for example, 8 g/m² or less.

The use of the sixth aspect of the invention and the system of the seventh aspect of the invention advantageously enhances the barrier properties of a coating layer comprising polyurethane resin such that:

$$A/(B \cdot C \cdot D) > 0.3, \text{ in which:}$$

A=oxygen transmission rate at 23° C. and 90% RH for a barrier material comprising a substrate coated with a coating layer comprising a polyurethane resin;
B=oxygen transmission rate at 23° C. and 90% RH for the barrier material further comprising a multivalent metal cation or other crosslinker applied over the barrier coating;
C=coating weight in g/m² (dry) of the coating layer comprising the polyurethane resin; and
D=coating weight in g/m² (dry) of the coating layer comprising the crosslinker.

Preferably $A/(B \cdot C \cdot D) > 0.4$. More preferably, $A/(B \cdot C \cdot D) > 0.8$, for example $>1.3$.

The above OTRs may, for example, be obtained when using a 12 µm thick corona treated film biaxially orientated PET film, such as, for example Mylar 800 PET film.

The OTR of the coated samples can, for example, be determined on a Mocon Oxtran 2/21 gas permeability tester at 23° C. and 90% relative humidity (RH). The MVTR of the coated samples can, for example, be determined on Mocon Permatran-W 3/33 tester at 38° C. and 90% RH. The OTR may, for example, be measured using the ASTM D3985 Standard Test Method for Oxygen Gas Transmission Rate through Plastic Film and Sheeting Using a Coulometric Sensor. Other suitable test methods include the ASTM F1927 Standard Test Method for Determination of Oxygen Gas Transmission Rate, Permeability and Permeance at Controlled Relative Humidity through Barrier Materials Using a Coulometric Detector and the ASTM F2622 Standard Test Method for Oxygen Gas Transmission Rate through Plastic Film and Sheeting Using Various Sensors. The MVTR may, for example, be measured using the ASTM F1249-06 Standard Test Method for Water Vapor Transmission Rate through Plastic Film and Sheeting Using a Modulated Infrared Sensor. Other suitable test methods include the ASTM E398-03 Standard Test Method for Water Vapor Transmission Rate of Sheet Materials Using Dynamic Relative Humidity Measurement and the ASTM D1434 Standard Test Method for Determining Gas Permeability Characteristics of Plastic Film and Sheeting.

In the present application, gas barrier properties are expressed as oxygen barrier properties. However, it is understood that oxygen barrier properties, expressed as oxygen transmission rates (OTR), is merely a test that is indicative of barrier resistance to virtually any gassing material that a formulator is trying to inhibit from escaping from an end-use material (e.g. a food package). This includes, but is not limited to nitrogen, carbon dioxide and other gases, water, aromatics and/or aromatic compounds among others.

Some of the advantages of the barrier coatings of the present application have been found to include:
- No need for nanoparticulates to boost gas and moisture vapor barriers, reducing health concerns.
- Due to the absence of PVDC-type coatings or extruded films, packaging materials including the coating of the invention are environmentally more favorable.
- The polyurethane does not include triethylamine, which has the potential to be retained, leading to migration issues within the intended package or article.
- The coatings of the invention allows for low film weight application, for example about 4-6 gsm wet.
- Multivalent metal cation can be applied at low film weight, for example about 4 gsm wet.
- Imparts superior gas and moisture vapor barrier properties.
- Enables fast drying times
- No need for heat curing.

The present invention has been described in detail, including the preferred embodiments thereof. However, it will be appreciated that those skilled in the art, upon consideration of the present disclosure, may make modifications and/or improvements on this invention that fall within the scope and spirit of the invention.

EXAMPLES

The following examples help to illustrate this invention. The following examples illustrate specific aspects of the present invention and are not intended to limit the scope thereof in any respect and should not be so construed.

The oxygen transmission rates of the coated samples were determined on a Mocon Oxtran 2/21 gas permeability tester at 23° C. and 90% relative humidity (RH). The moisture vapor transmissions of the coated samples were determined on Mocon Permatran-W 3/33 tester at 38° C. and 90% RH. The substrates used in all cases was either corona discharge treated Mylar 800 (12 μm gauge), orientated polyamide (30 μm gauge), or polypropylene (e.g. MB400 23 μm gauge). The coatings were applied with a No. O and No. 1 K-bar (4 gsm and 6 gsm wet, respectively) and were dried in a warm flow of air (lab prints were dried with a hair dryer) until tack-free. In each case, the solvent soluble polyurethane was applied followed by the metal cation solution as this is the preferred configuration. However, the order could be changed (i.e. cation solution printed first and the polyurethane printed over the top). Though the preferred embodiment is a single coating of each of the urethane and the cation to form a synergistic two-coat system, the present application is not limited to this configuration. In other embodiments, multiple layers of polyurethane and cation can be applied in any number or order. Thus, the present application is not limited to a single coating of polyurethane and a single coating of cation, though as will be shown, at least one coating of each is necessary in order to obtain good gas and moisture vapor properties.

Surface treatment is a known method for improving bond strength and any method known in the art (corona, flame, plasma, etc.) could be used. However, surface treatment is optional and not a requirement. It would also be possible to use substrates that are not surface treated as long as the laminates produced from the non-surface treated substrates exhibit acceptable bond strength performance. In the present examples, the laminates were prepared by applying the two-coat system to corona surface treated substrates. An adhesive was applied over the top of the dried two-coat system then laminated to the treated side of a 30 μm gauge poly(ethene). The adhesive used was supplied by Coim, NC250A along with Catalyst CA 350, and was prepared according to the manufacturers instructions and applied so as to achieve a final dry film weight of about 2.5 gsm. The laminates were then stored for 7 days at 35° C. to ensure full cure of the isocyanate-based adhesive. The laminates were then tested for bond strength (N/15 mm) and oxygen barrier properties.

Solvent Soluble Polyurethanes

Synthesis of a solvent soluble polyurethane (PU) with innate gas and moisture vapor barrier properties. The average molecular weight of the PU varies according to solvent, quantities of reactants, catalyst and polyol types etc., however for a solvent soluble polyurethane of the invention, the molecular weight would preferably be 500-900000, more preferably about 500 to 600000, most preferably 500 to 150000.

PU 1:

A vessel was charged with 2.78 parts of 1,3-bis(isocyanatomethyl)benzene, 6.97 parts of 1,3-bis(isocyanatomethyl)cyclohexane, 9.77 parts of polyol e.g. bishydroxyethyl terephthalate and 1.76 parts of 2,2-dimethylol propionic acid in 78.7 parts of methylethyl ketone as the solvent. The vessel was purged with nitrogen and stirred at 80° C. for 3 to 10 hours until no unreacted isocyanates remained.

PU 2:

A vessel was charged with 2.96 parts of 1,3-bis(isocyanatomethyl)benzene, 8.4 parts of isophorone diisocyanate, 10.4 parts of polyol e.g. bishydroxyethyl terephthalate and 1.82 parts of 2,2-dimethylol propionic acid in 76.34 parts of methylethyl ketone as the solvent. The vessel was purged with nitrogen and stirred at 80° C. for 3 to 10 hours until no unreacted isocyanates remained.

PU 3:

A vessel was charged with 2.91 parts of 1,3-bis(isocyanatomethyl)benzene, 9.87 parts of methylene-bis(4-cyclohexyl isocyanate), 10.23 parts of polyol e.g. bishydroxyethyl terephthalate and 1.79 parts of 2,2-dimethylol propionic acid in 75.2 parts of methylethyl ketone as the solvent. The vessel was purged with nitrogen and stirred at 80° C. for 3 to 10 hours until until no unreacted isocyanates remained.

PU 4:

A vessel was charged with 14.66 parts of methylene-bis(4-cyclohexyl isocyanate), 10.65 parts of polyol e.g. bishydroxyethyl terephthalate and 2.04 parts of 2,2-dimethylol propionic acid in 72.65 parts of methylethyl ketone as the solvent. The vessel was purged with nitrogen and stirred at 80° C. for 3 to 10 hours until no unreacted isocyanates remained.

Water-Dispersible Polyurethanes

Synthesis of a polyurethane (PU) dispersions in water-miscible solvents with innate gas and moisture vapor barrier properties.

PU 5:

A vessel was charged with 5.8 parts of isophorane diisocyanate, 11.9 parts of methylene-bis(4-cyclohexyl isocyanate), 12.9 parts of polyol e.g. bishydroxyethyl terephthalate and 1.7 parts of 2,2-dimethylol propionic acid in 64.6 parts of methylethyl ketone as the solvent. The vessel was purged with nitrogen and stirred at 80° C. for 3 to 10 hours until the desired isocyanate value of 0.0398 molar equivalents was achieved (determined by titration). The reaction temperature was lowered to 50° C. and 3.2 parts of 2[2-aminoethyl) amino]ethanol was added as the chain extension agent. After 30 minutes 90 gram of ethanol was added and the reaction left to stir for a further 30 minutes. 13 gram of deionised water was added and the reaction allowed to cool to room temperature. The methylentyl ketone was then removed under reduced pressure producing a polyurethane dispersion (PU5) having a solids content of 41% solids and an acid value of 17.8 mg KOH·$g^{-1}$.

PU 6:

A vessel was charged with 4.98 parts of 1,3-bis(isocyanatomethyl)benzene, 10.28 parts of 1,3-bis(isocyanatomethyl)cyclohexane, 2.71 parts of ethylene glycol and 1.47 parts of 2,2-dimethylol propionic acid in 8.76 parts of methylethyl ketone as the solvent. The vessel was purged with nitrogen and stirred at 80° C. for 3 to 5 hours until the desired isocyanate value of 0.076 mol equivalent was obtained. The pre-polymer formed was cooled to 40-50° C. and then neutralized with 1.05 parts of triethylamine. After stirring the pre-polymer for 40 minutes at 40-50° C., the pre-polymer was cooled to 25-30° C. and then dispersed into 68.42 parts of deionized water at 2000 rpm using a dispermat-CV stirrer. 2.33 parts of 2[2-aminoethyl)amino]ethanol was added as the chain extension agent. After completion, the methylethyl ketone was removed under reduced pressure, producing a water based polyurethane dispersion (PU1) having a solids content of 31% solids and an acid value of 24.3 mg KOH·$g^{-1}$.

Takelac WPB-341 is a commercial polyurethane resin obtained from Mitsui Chemicals, Inc. Example resin PUD1 described in EP 1 674 529 is a close match to Takelac WPB-341.

Barrier Coatings

In the comparative examples described below, the polyurethanes described above were coated onto substrate films and the barrier properties were determined. In the example barrier coatings of the invention, a further coating of a multivalent metal cation was applied onto the polyurethane coating and the barrier properties were again determined.

Multivalent metal cations were supplied as aqueous solutions and/or adjusted with an organic solvent. Alternatively, the metal cations can be supplied in a solvent based system. In the examples shown in Tables 1 and 2, 23 wt % a solution of ZnO supplied by BASF was utilized as the crosslinking and/or backbone chelator agent. The coating weight of the ZnO solution was 6 gsm applied using a #1 K-bar.

TABLE 1

Oxygen Transmission and Moisture Vapor Transmission Rates Moisture Vapor Transmission Rates of Surface Coatings.

| Example | Solids | PU | Substrate | Metal cation | OTR 90% RH, 23° C. | MVTR 90% RH, 38° C. |
|---|---|---|---|---|---|---|
| Uncoated Mylar 800 PET | — | — | Mylar 800 PET | — | 100-112 | 35-40 |
| Uncoated OPP (MB400) | — | — | OPP MB400 | — | >1500 | 4-8 |

TABLE 1-continued

Oxygen Transmission and Moisture Vapor Transmission Rates Moisture Vapor Transmission Rates of Surface Coatings.

| Example | Solids | PU | Substrate | Metal cation | OTR 90% RH, 23° C. | MVTR 90% RH, 38° C. |
|---|---|---|---|---|---|---|
| Example 1A: comparative (w/o cation) | 19 | 1 | Mylar 800 PET | None | 88 | 42 |
| Example 1B: inventive (with cation) | 19 | 1 | Mylar 800 PET | ZnO | 3 | 9 |
| *Example 1C: inventive (with cation) | 19 | 1* | Mylar 800 PET | ZnO | 5 | 8 |
| Example 1D: inventive (with cation) | 19 | 1 | OPP MB400 | ZnO | 3.7 | 1.8 |
| Example 1E: inventive (with cation) | 19 | 1 | OPA | ZnO | 1.3 | 10.9 |
| Example 2A: comparative (w/o cation) | 28 | 2 | Mylar 800 PET | None | 91 | 38 |
| Example 2B: inventive (with cation) | 28 | 2 | Mylar 800 PET | ZnO | 11.2 | 14 |
| Example 3A: comparative (w/o cation) | 31 | 3 | Mylar 800 PET | None | 86 | 45 |
| Example 3B: inventive (with cation) | 31 | 3 | Mylar 800 PET | ZnO | 9.23 | 11.9 |
| Example 4A: comparative (w/o cation) | 27 | 4 | Mylar 800 PET | No | 98 | 44 |
| Example 4B: inventive (with cation) | 27 | 4 | Mylar 800 PET | ZnO | 1.8 | 16 |
| Example 5A: comparative (w/o cation) | 41 | 5 | Mylar 800 PET | No | 76 | 42 |
| Example 5B: inventive (with cation) | 41 | 5 | Mylar 800 PET | ZnO | 4.3 | 14 |

*Example 1C PU 1 was Neutralized with Ammonia in ethanol (20-40%)

The results shown in Table 1 demonstrate the excellent gas and moisture vapor barrier properties when using the two-coat system of the present application. In each case, the PU and metal cation coatings were applied using a IK-bar at a coating weight of 6 gsm net.

The oxygen barrier properties of the uncoated Mylar 800 PET film is as follows: a 12 µm thick film at 23° C. and 90% RH has an OTR of about 100-112 $cm^3/m^2$/day. Moisture vapor barrier properties of Mylar 800 PET film is as follows: 12 µm thick PET at 38° C. and 90% RH has an MVTR of about 35-40 $g/m^2$/day.

A polyurethane resin devoid of any particulates, for example PU1 as prepared as described above, applied as a single coating (Example 1A) does not provide sufficient barrier properties at 90% RH. However, an application of ZnO solution at 6 gsm wet, applied in this example over the top of the polyurethane dispersion coating (Example 1B), produces a 29-fold reduction in oxygen transmission rate and 4.7-fold reduction in moisture vapor transmission rate.

Similar results are produced for OPA substrates and more impressively for OPP (MB400). Oxygen barrier properties of the MB400 uncoated film (23 µm thick, 23° C. and 90% RH) is >1500 $cm^3/m^2$/day. Thus, the OTR gas barrier of properties of the base film MB400 is reduced by nearly 400-fold by the 2-coat system, 3 µm thick barrier coating.

Moisture vapor barrier properties of MB400 uncoated film is as follows: 23 μm thick MB400 at 38° C. and 90% RH has an MVTR of about 4-8 g/m²/day. Thus, the MVTR is reduced by >50% by the 2-coat system, when compared to the MB400 base film.

ZnO solution at 6 gsm wet (Example 8B), produces an impressive 200-fold reduction in oxygen transmission rate and a nearly 6-fold reduction of moisture vapor transmission compared with a single coating (Example 8A). Compared to the uncoated Mylar 800 base film, the gas barrier properties

TABLE 2

Oxygen transmission and moisture vapor transmission rates of surface coatings prepared from example polyurethane dispersion PU6 and commercial polyurethane dispersions.

| Example | PU | Neutralization with ammonia | Coating weight of PU | Substrate | Metal cation | OTR 90% RH, 23° C. | MVTR 90% RH, 38° C. |
|---|---|---|---|---|---|---|---|
| Uncoated (control) | — | — | — | Mylar 800 PET | — | 100-112 | 35-40 |
| Example 6A (Comparative) | PU6 | yes | #1 K-bar (6 gsm) | Mylar 800 PET | None | 73 | 27 |
| Example 6B (Inventive) | PU6 | yes | #1 K-bar (6 gsm) | Mylar 800 PET | Yes | 4.5 | 6 |
| Example 7A (Comparative) | Takelac WPB-341 | no | #1 K-bar (6 gsm) | Mylar 800 PET | None | 70 | 33 |
| Example 7B (Inventive) = | Takelac WPB-341 | no | #1 K-bar (6 gsm) | Mylar 800 PET | Yes | 2.91 | 6 |
| Example 8A (Comparative) | Takelac WPB-341 | yes | #1 K-bar (6 gsm) | Mylar 800 PET | None | 68 | 32 |
| Example 8B (Inventive) | Takelac WPB-341 | yes | #1 K-bar (6 gsm) | Mylar 800 PET | Yes | 0.34 | 5.6 |
| Example 10 (Inventive) | Takelac WPB-341 | yes | #0 K-bar (4 gsm) | Mylar 800 PET | Yes | 1.4 | 8.2 |
| Example 11 (Inventive) | Takelac WPB-341 | yes | #1 K-bar (6 gsm) | OPA | Yes | 0.22 | 11.1 |
| Example 12 (Inventive) | Takelac WPB-341 | yes | #1 K-bar (6 gsm) | OPP | Yes | 1.68 | 2.2 |
| Example 13 (Comparative) | Joncryl 90 | yes | #1 K-bar (6 gsm) | Mylar 800 PET | Yes | 95 | 46 |

Note:
All of the examples in Table 2 were neutralized with ammonia with the exception of Examples 7A and 7B, which are based on commercial Takelac WPB-341 containing triethylamine. In the case of Examples 8A and 8B, also based on Takelac WPB-31, the triethylamine was removed and replaced with ammonia. In all cases the solids content of the polyurethane coating was 31.

The results shown in Table 2 demonstrate the excellent gas and moisture vapor barrier properties when using the two-coat system of the present application.

The oxygen barrier properties of the uncoated Mylar 800 PET film is as follows: a 12 μm thick film at 23° C. and 90% RH has an OTR of about 100-112 cc/m²/day. Moisture vapor barrier properties of Mylar 800 PET film is as follows: 12 μm thick PET at 38° C. and 90% RH has an MVTR of about 35-40 g/m²/day.

A polyurethane resin devoid of any particulates, for example PU1 as prepared as described above, applied as a single coating (Example 6A) does not provide sufficient barrier properties at 90% RH. However, an application of ZnO solution at 6 g/m² wet, applied in this example over the top of the polyurethane dispersion coating (Example 6B), produces a 16-fold reduction in oxygen transmission rate and 4.5-fold reduction in moisture vapor transmission rate.

Mitsui Takelac WPB-341, a commercial gas barrier polyurethane dispersion was applied at the same coating weights and solids, and tested under identical conditions as Examples 6A and 6B. As a single coating, Example 7A produces similar (insufficient) oxygen and moisture vapor barrier results as Example 6A. A coating of ZnO solution at 6 gsm wet, applied over the top of WPB-341, produces a 24-fold reduction in oxygen transmission rate and a 5.5 fold reduction in moisture vapor transmission rate (Example 7B).

Similarly, a coating of a commercial barrier polyurethane neutralized with ammonia and subsequently overcoated with of Example 8B results in an approximately 300-fold reduction in OTR, and an approximately 7-fold reduction in MVTR.

Similar results are produced for OPA and more impressively for OPP (MB400). Oxygen barrier properties of the MB400 uncoated film (23 μm thick, 23° C. and 90% RH) is >1500 cm³/m²/day. The OTR gas barrier of properties of the base film MB400 is reduced by nearly 900-fold by the 2-coat system, 3 μm thick barrier coating. The MVTR is reduced by >50% when compared to the base film, uncoated MB400 (OPP).

While not limiting to any particularly theory, it is possible that the ZnO crosslinks the carboxylic groups of the polyurethane at the surface, with a degree of penetration in to the polyurethane coating, accessing carboxylic groups within the coating and/or below the surface of the coating. A secondary mechanism may also operates within the coating implicating a chelation mechanism between the ZnO and the urethane backbone. This causes a dramatic reduction in free volume within the polymer coating and superior gas and barrier properties. To add further understanding to the mechanism or role of the carboxyl groups and the chelation to the urethane backbone, Joncryl 90 (an acrylic emulsion devoid of any urethane groups), was overcoated with ZnO solution (Example 13), no enhancement of barrier properties was observed.

Traditionally, polyurethanes have exhibited excellent adhesion and laminate bond strengths to a variety of surfaces and substrates. A test was performed to measure bond strengths of the inventive 2-coat system.

TABLE 3

Laminate Bond Strengths on Various Substrates
using the coating systems of Examples 1B and 6B

| Substrate | Barrier System | Laminate Bond Strength to PE N/15 mm |
|---|---|---|
| PET 12 μm | (1) PU1, (2) ZnO solution | 2.0 |
| OPP 12 μm | (1) PU1, (2) ZnO solution | 1.8 |
| PET 12 μm | (1) PU6 + (2) ZnO solution | 1.8 |
| OPP 12 μm | (1) PU6 + (2) ZnO solution | 1.5 |
| OPA 30 μm | (1) PU6 + (2) ZnO solution | 5.3 (FT) |

Note:
A laminate bond strength of >1N/15 mm is considered an acceptable result. During bond strength testing, a tearing of the polyester film (FT) would indicate a likely bond strength in excess of 3.0N/15 mm. In the case of the OPA, as shown in Table 2, the film tear occurred at a bond strength of 5.3, which indicates that the actual bond strength would be >5.3, and well above the threshold for an acceptable result.

Table 3 Confirms, that the 2-coat system, which utilizes ZnO, which acts synergistically with the polyurethane to give good gas and moisture barrier properties, also produces laminate structures with good bond strength properties.

TABLE 4

OTR and MVTR Values of Laminates Made from Examples 1B and 6B (Inventive 2-coat System) vs. Laminates Made from Examples 1A and 6A (w/o Cation Coating)

| Laminate Structure | Laminate adhesive | Barrier System | OTR of laminate cc/[m$^2$ - day] 90% RH, 23° C. | MVTR of laminate gm/[m$^2$ - day] 90% RH, 38° C. |
|---|---|---|---|---|
| PET:PU1:adhesive:PE (comparative) | NC250A | PU 1 only | 95 | 6.5 |
| OPP:PU1:adhesive:PE (comparative) | NC250A | PU 1 only | 1200 | 3.5 |
| PET:PU1:ZnO:adhesive:PE (Inventive) | NC250A | 2-coat system (PU1 + ZnO) | 1.8 | 2.8 |
| OPP:PU1:ZnO:adhesive:PE (Inventive) | NC250A | 2-coat system (PU1 + ZnO) | 5.7 | 2.1 |
| PET:PU6:adhesive:PE (comparative) | NC250A | PU6 only | 95 | 6.5 |
| OPP:PU6:adhesive:PE (comparative) | NC250A | PU6 only | 1200 | 3.5 |
| PET:PU6:ZnO:adhesive:PE (Inventive) | NC250A | 2-coat system (PU6 + ZnO) | 1.8 | 2.8 |
| OPP:PU6:ZnO:adhesive:PE (Inventive) | NC250A | 2-coat system (PU6 + ZnO) | 5.7 | 2.1 |

In all laminates NC250A and CA350 (Novacote 250 A:B (CA350) in a ratio of 20:1) a two-component polyurethane adhesive available from COIM of Settimo Milanese, Italy was used as the adhesive applied at 12 gsm wet at 40% non volatile solids.

Table 4 Confirms that fully formed laminates, including adhesive, made with the 2-coat system of the present application, exhibit good gas and moisture vapor barrier properties, while those that are made with the polyurethane dispersion alone (without the cation coating) do not exhibit good gas and vapor barrier properties.

The invention claimed is:

1. A method of preparing a two-coat barrier layer comprising the step of applying a second coating comprising a multivalent metal cation dispersed or dissolved in a liquid vehicle, wherein the liquid vehicle is water, an organic solvent, or a combination thereof, and optionally a surfactant, onto a first coating,
the first coating comprising a polyurethane resin, wherein the polyurethane resin is the reaction product of a diisocyanate and one or more polyols selected from $C_{2-10}$ polyols and/or polyols having a molecular weight (Mr) of no more than 350,
wherein the first coating and the second coating are not heat cured,
wherein no more than 10 wt. % of the total solid content of the first and second coatings is inorganic laminar filler materials.

2. The method of claim 1, wherein the first coating comprises a water-dispersible polyurethane resin or an organic solvent-soluble polyurethane resin.

3. The method of claim 1, wherein the first coating comprises a combination of the polyurethane resin and a neutralizing agent.

4. The method of claim 1, wherein the one or more polyols includes a polyhydroxy acid.

5. The method of claim 1, further comprising dissolving the polyurethane resin in an organic solvent, wherein the polyurethane resin includes acid groups.

6. The method of claim 1, wherein at least 10% by weight of the polyurethane resin is made up of urethane groups, and urea groups if present.

7. The method of claim 1 wherein less than about 5 wt % of the barrier layer is inorganic laminar filler materials.

8. The method of claim 1 wherein less than or equal to 2 wt % of the solid content of the barrier layer is inorganic laminar filler materials.

9. The method of claim 1 wherein the barrier layer includes no inorganic laminar filler materials.

10. A two-coat barrier layer comprising the product of the polyurethane resin and a multivalent metal cation, prepared according to the method of claim 1.

11. The barrier layer of claim 10, providing an oxygen transmission rate (OTR) at 90% RH and 23° C. of no more than 8 cm$^3$/m$^2$/day wherein a coating weight of the polyurethane resin is no more than 12 g/m$^2$.

12. The barrier layer of 17, providing a moisture vapor transmission rate (MVTR) at 90% RH and 38° C. of no more than 15 g/m$^2$/day, wherein a coating weight of the polyurethane resin is no more than 12 g/m$^2$.

13. A barrier material including the barrier layer of claim 10 coated on a substrate, the barrier layer comprising a polyurethane resin and less than about 5 wt % inorganic laminar filler materials.

14. A barrier material comprising the barrier layer of claim 10 on a substrate.

15. The barrier material of claim 14, providing an oxygen transmission rate (OTR) at 90% RH and 23° C. of no more than 8 cm$^3$/m$^2$/day wherein a coating weight of the polyurethane resin is no more than 12 g/m$^2$.

16. The barrier material of claim 14, providing a moisture vapor transmission rate (MVTR) at 90% RH and 38° C. of no more than 15 g/m2/day, wherein a coating weight of the polyurethane resin is no more than 12 g/m2.

17. A laminate film including a barrier material comprising a barrier layer on a substrate, the barrier layer comprising the product of the polyurethane resin and the multivalent metal cation, prepared according to the method of claim 1.

18. A packaging material that incorporates a barrier material comprising a two-coat barrier layer on a substrate, the barrier layer comprising the product of the polyurethane resin and the multivalent metal cation, prepared according to the method of claim 1.

19. A two-coat barrier system comprising:
a. a first coating comprising a polyurethane resin, wherein the polyurethane resin is the reaction product of a diisocyanate and one or more polyols selected from $C_{2-10}$ polyols and/or polyols having a molecular weight (Mr) of no more than 350; and
b. a second coating formed from a coating composition comprising a multivalent metal cation dispersed or dissolved in a liquid vehicle, wherein the liquid vehicle is water, an organic solvent, or a combination thereof, and optionally a surfactant;
wherein the first coating and second coating are not heat cured, and
wherein no more than 10 wt. % of the total solid content of the first and second coatings is inorganic laminar filler materials.

20. The two-coat barrier system of claim 19, wherein the first coating is formed from a dispersion of a polyurethane resin in an aqueous or water-miscible solvent, or wherein the first coating is a solution of a polyurethane resin in an organic solvent.

21. The two-coat barrier system of claim 20, wherein the first coating is formed from a dispersion of a neutralized polyurethane resin in an aqueous or water-miscible solvent.

22. The two-coat barrier system of claim 19, wherein at least 10% by weight of the polyurethane resin is made up of urethane groups, and urea groups if present.

23. The two-coat barrier system of claim 19, wherein the polyurethane resin includes acid groups.

24. The two-coat barrier system of claim 19, that provides an oxygen transmission rate (OTR) at 90% RH and 23° C. of no more than 8 cm3/m2/day, when the first coating is applied at a coating weight of 12 g/m2 or less to a 12 µm thick corona surface treated biaxially orientated PET film and the second coating is applied onto the first coating.

25. The two-coat barrier system of claim 19, that provides a moisture vapor transmission rate (MVTR) at 90% RH and 38° C. of no more than 15 g/m2/day, when the first coating is applied at a coating weight of 12 g/m2 or less to a 12 µm thick corona surface treated biaxially orientated PET film and the second coating is applied onto the first coating.

26. A method of enhancing the barrier properties of a barrier material including a two-coat barrier layer, the barrier layer comprising a first coating including a polyurethane resin coated on a substrate, the method comprising the step of applying onto the first coating a second coating comprising a multivalent metal cation dispersed or dissolved in a liquid vehicle, wherein the liquid vehicle is water, an organic solvent, or a combination thereof, and optionally a surfactant, wherein no heat curing is used in preparation of the barrier material, and
wherein no more than 10 wt. % of the total solid content of the first and second coatings is inorganic laminar filler materials; wherein the polyurethane resin in the first coating is the reaction product of a diisocyanate and one or more polyols selected from C2-10 polyols and/or polyols having a molecular weight (Mr) of no more than 350.

27. The method of claim 26 wherein the polyurethane resin is made up of urethane groups, and urea groups if present.

28. The method of claim 26, wherein the step of applying the second coating comprising the multivalent metal cation, reduces the oxygen transmission rate (OTR) at 90% RH and 23° C. in cm$^3$/m$^2$/day of the coating layer by at least 50%.

29. The method of claim 26, wherein the step of applying the second coating comprising the multivalent metal cation, reduces the moisture vapor transmission rate (MVTR) at 90% RH and 38° C. in g/m2/day of the coating layer by at least 10%.

30. The method of claim 26, wherein A/(B·C)>2, in which:
A=oxygen transmission rate at 23° C. and 90% RH in g/m$^2$/day for the barrier material including a substrate coated with the first coating;
B=oxygen transmission rate at 23° C. and 90% RH in g/m$^2$/day for the barrier material further comprising the second coating applied onto the first coating; and
C=coating weight in g/m$^2$ (dry) of the coating layer.

31. A system for enhancing the barrier properties of a two-coat barrier layer comprising: a first coating comprising a polyurethane resin, wherein the polyurethane resin is the reaction product of a diisocyanate and one or more polyols selected from C2-10 polyols and/or polyols having a molecular weight (Mr) of no more than 350; and a second coating comprising multivalent metal cation dispersed or dissolved in a liquid vehicle, wherein the liquid vehicle is water, an organic solvent, or a combination thereof, and optionally a surfactant applied onto the first coating layer; wherein two-coat barrier layer is applied on a substrate according to the formula A/(B·C)>2, in which:
A=the oxygen transmission rate at 23° C. and 90% RH in g/m2/day for the first coating layer and the substrate;
B=the oxygen transmission rate at 23° C. and 90% RH in g/m2/day for the two-coat barrier layer and the substrate; and
C=a coating weight in g/m2 (dry) of the first coating layer; and
wherein the first coating and second coating are not heat cured, and no more than 10 wt. % of the total solid content of the first and second coatings is inorganic laminar filler materials.

* * * * *